(12) United States Patent
Tammali et al.

(10) Patent No.: US 12,412,437 B2
(45) Date of Patent: *Sep. 9, 2025

(54) VEHICLE MODE DETERMINATION BASED ON EDGE-COMPUTING

(71) Applicant: Allstate Insurance Company, Northbrook, IL (US)

(72) Inventors: Venu Tammali, Chicago, IL (US); Clayton Jeschke, Chicago, IL (US); Melanie Hanna, Evanston, IL (US); Kyle Patrick Schmitt, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,359

(22) Filed: May 2, 2023

(65) Prior Publication Data
US 2023/0267781 A1 Aug. 24, 2023

Related U.S. Application Data

(63) Continuation of application No. 16/843,959, filed on Apr. 9, 2020, now Pat. No. 11,676,430.

(51) Int. Cl.
*G07C 5/08* (2006.01)
*G06N 20/10* (2019.01)
*G08G 1/01* (2006.01)
*G08G 1/015* (2006.01)

(52) U.S. Cl.
CPC .......... *G07C 5/0841* (2013.01); *G06N 20/10* (2019.01); *G07C 5/0808* (2013.01)

(58) Field of Classification Search
CPC ..... G07C 5/0841; G07C 5/0808; G06N 20/10; G08G 1/0112; G08G 1/0133; G08G 1/015; H04W 4/027
USPC ........................................ 701/33.4
See application file for complete search history.

(56) References Cited

U.S. PATENT DOCUMENTS

| 8,015,144 B2 | 9/2011 | Zheng et al. |
| 8,249,807 B1 | 8/2012 | Barbeau et al. |
| 8,954,094 B1 | 2/2015 | Mishra et al. |
| 8,983,766 B2 | 3/2015 | Morley |

(Continued)

FOREIGN PATENT DOCUMENTS

CN 108510011 A 9/2018

OTHER PUBLICATIONS

Jul. 13, 2022—(CA) Office Action—App 3,114,082, 6 Pages.
(Continued)

*Primary Examiner* — Tyler D Paige
(74) *Attorney, Agent, or Firm* — Akerman LLP

(57) ABSTRACT

Methods, computer-readable media, software, and apparatuses may determine, based upon edge-computing operations, that a vehicular trip has been initiated and cause one or more sensors to collect vehicle data. One or more trip segments for at least a portion of the vehicular trip may be determined. In some aspects, for each trip segment, a first plurality of time features and a second plurality of frequency features may be determined, and may be concatenated with a third plurality of GPS features to form a feature vector. An accuracy measure may be determined based on the feature vector, and a mode for the vehicle may be predicted.

19 Claims, 19 Drawing Sheets

(56) References Cited

U.S. PATENT DOCUMENTS

| | | |
|---|---|---|
| 9,049,558 B2 | 6/2015 | Jones et al. |
| 9,305,317 B2 | 4/2016 | Grokop et al. |
| 9,438,721 B2 | 9/2016 | Rose et al. |
| 9,723,383 B2 | 8/2017 | Jang et al. |
| 9,809,159 B1 * | 11/2017 | Snyder .................. B60W 40/09 |
| 9,846,977 B1 * | 12/2017 | Cox ....................... G07C 5/085 |
| 9,888,392 B1 * | 2/2018 | Snyder .................... H04W 4/44 |
| 10,072,932 B2 | 9/2018 | Cordova et al. |
| 10,217,055 B2 | 2/2019 | Cordova et al. |
| 11,377,111 B1 * | 7/2022 | Guziec ................. G01G 19/086 |
| 11,676,430 B2 * | 6/2023 | Tammali ................ G06N 20/10 |
| | | 701/33.4 |
| 2015/0087264 A1 | 3/2015 | Goyal |
| 2015/0177013 A1 | 6/2015 | Siliski et al. |
| 2016/0066155 A1 * | 3/2016 | Fan ....................... G06F 3/0484 |
| | | 455/457 |
| 2017/0265044 A1 * | 9/2017 | Lundsgaard ............ H04W 4/40 |
| 2017/0347237 A1 | 11/2017 | Varshavsky et al. |
| 2018/0292471 A1 | 10/2018 | Chen et al. |
| 2019/0050624 A1 | 2/2019 | Chai et al. |

OTHER PUBLICATIONS

Bedogni L., et al., "By Train or By Car? Detecting the User's Motion Type Through Smartphone Sensors Data," IEEE, 2012, 6 Pages.

Fang S.H., "Transportation Modes Classification Using Sensors on Smartphones," PubMed, NCBI, Aug. 19, 2016, 2 Pages.

Guinness R., "Beyond Where to How: A Machine Learning Approach for Sensing Mobility Contexts Using Smartphone Sensors," Cyber, 2015, 28 Pages.

Jahangiri A., et al., "Applying Machine Learning Techniques to Transportation Mode Recognition Using Mobile Phone Sensor Data," IEEE Transactions on Intelligent Transportation Systems, 1524-9050, 2015, 12 Pages.

Stenneth L., et al., "Transportation Mode Detection Using Mobile Phones and GIS Information," University of Illinois, Nov. 1-4, 2011, 10 Pages.

"Using Smart Phone Sensors to Detect Transportation Modes," Sensors MDPI, Nov. 4, 2014, 31 Pages.

Wang L., et al., "Enabling Reproducible Research in Sensor-Based Transportation Mode Recognition with the Susses-Huawei Dataset," IEEE Access, Jan. 29, 2019, 22 Pages.

* cited by examiner

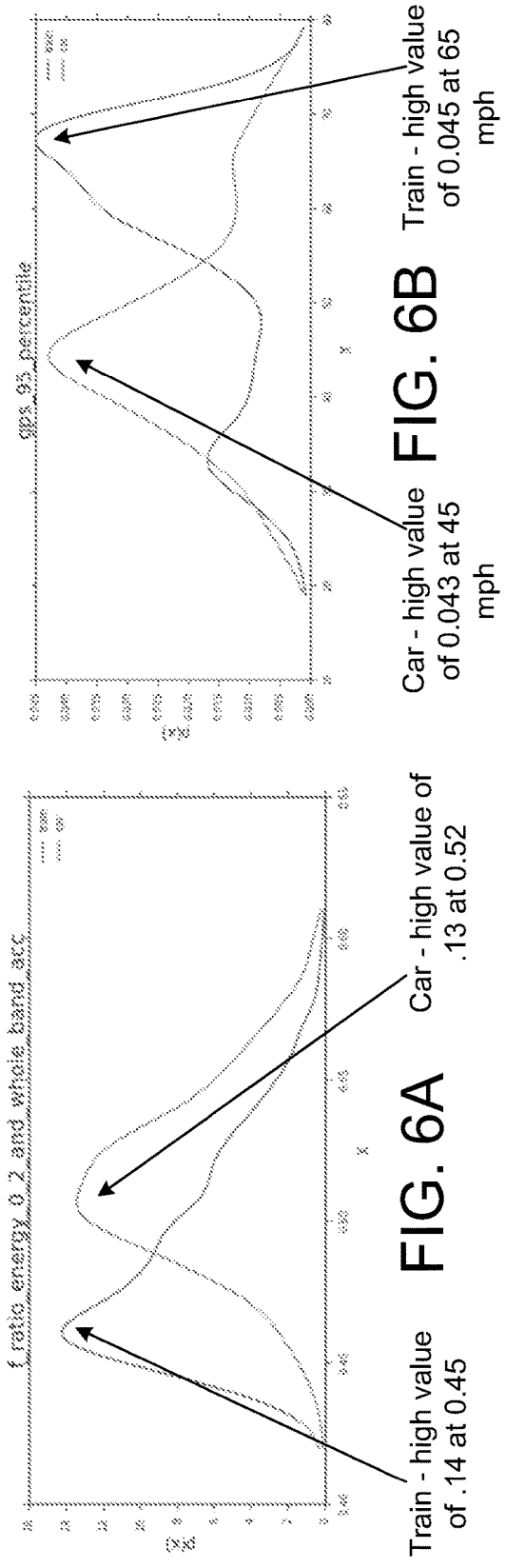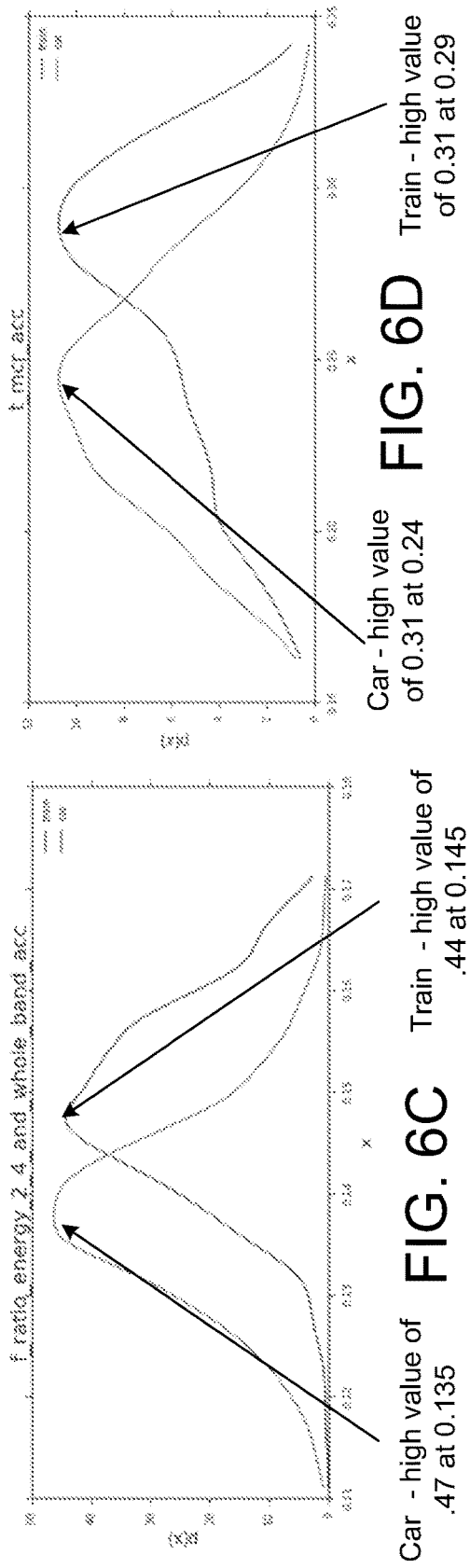
FIG. 6A — Train - high value of .14 at 0.45; Car - high value of .13 at 0.52
FIG. 6B — Train - high value of 0.045 at 65 mph; Car - high value of 0.043 at 45 mph
FIG. 6C — Train - high value of .44 at 0.145; Car - high value of .47 at 0.135
FIG. 6D — Train - high value of 0.31 at 0.29; Car - high value of 0.31 at 0.24
Examples of strong features (car vs. train case)

SVM Model Results

| | C1 | C2 | C3 | C4 | C5 | C6 |
|---|---|---|---|---|---|---|
| | Car vs. | AUC | Car trips kept | Train fraction | Lowpass cutoff | Z-value cutoff |
| R1 | | | | | | |
| R2 | Train | 0.988 | 8,000 | 0.8 | 9 | 1.75 |
| R3 | Bus | 0.965 | 8,000 | 0.8 | 9 | 2.0 |
| R4 | boat | 0.983 | 2,200 | 0.8 | 9 | 3.5 |
| R5 | bicycle | 0.840 | 6,000 | 0.8 | 9 | 10.0 |
| R6 | airplane | 0.990 | 6,000 | 0.8 | 9 | 10.0 |
| R7 | motorcycle | 0.712 | 2,500 | 0.8 | 9 | 10.0 |

FIG. 8

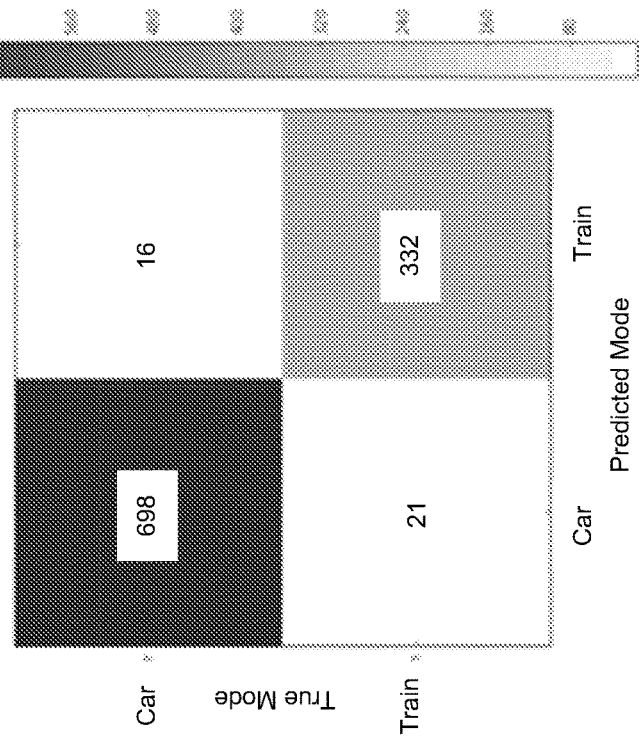
FIG. 9A
FIG. 9C
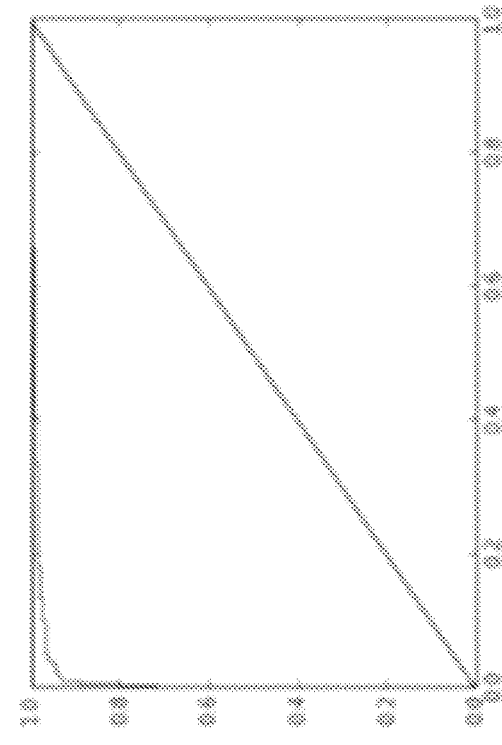
FIG. 9B

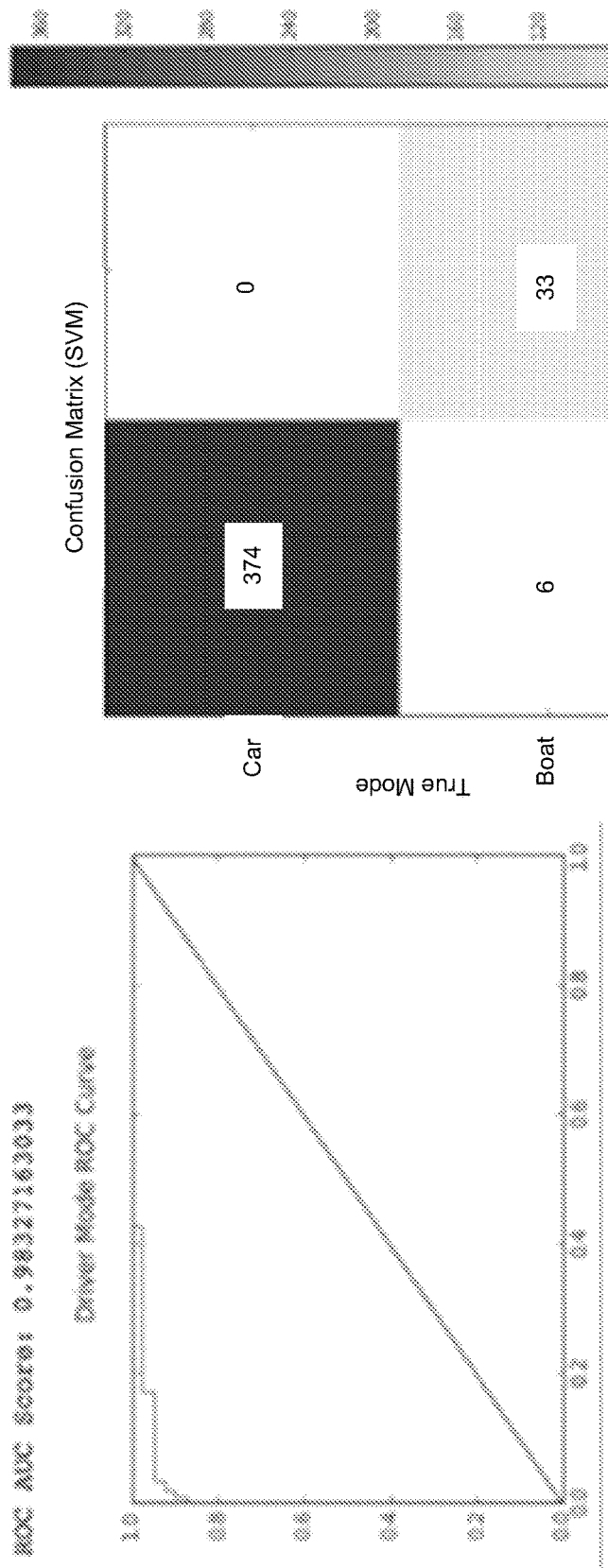
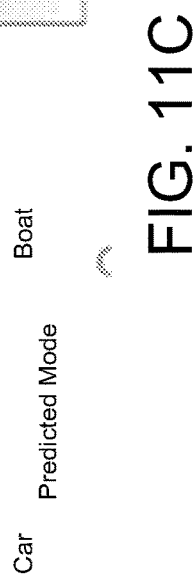
FIG. 11A  FIG. 11B  FIG. 11C

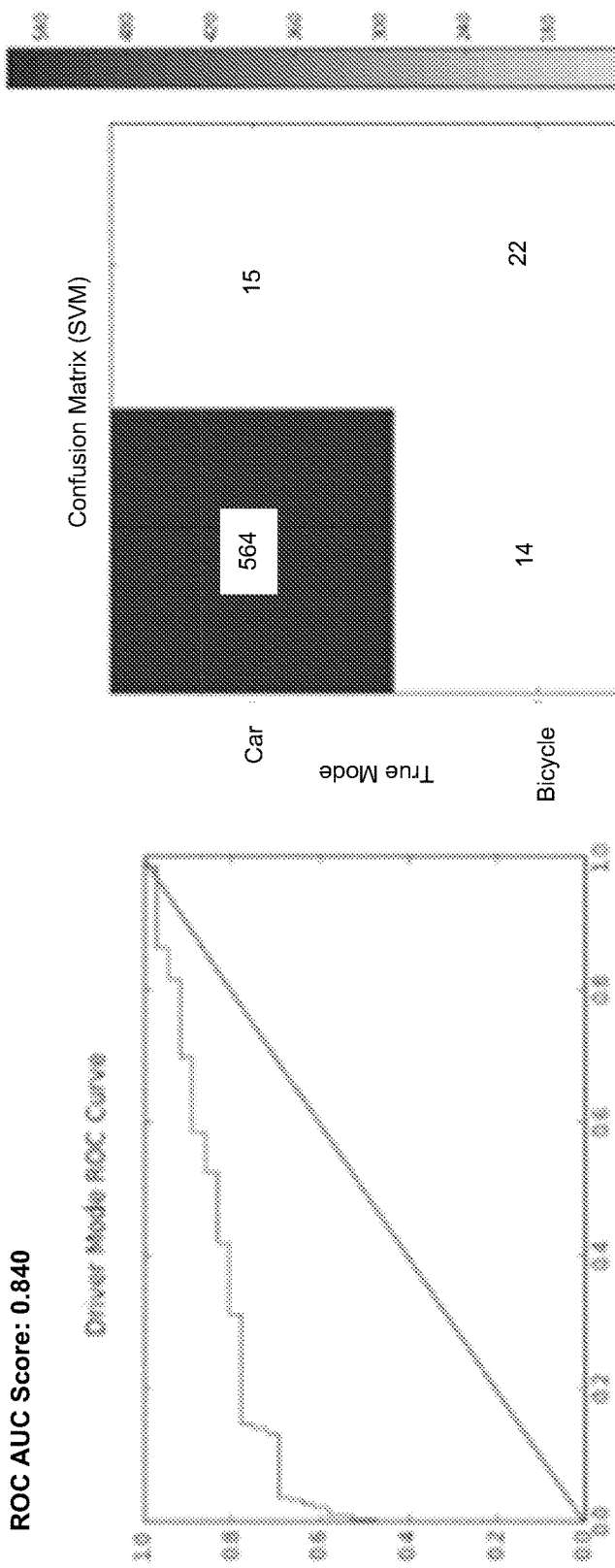

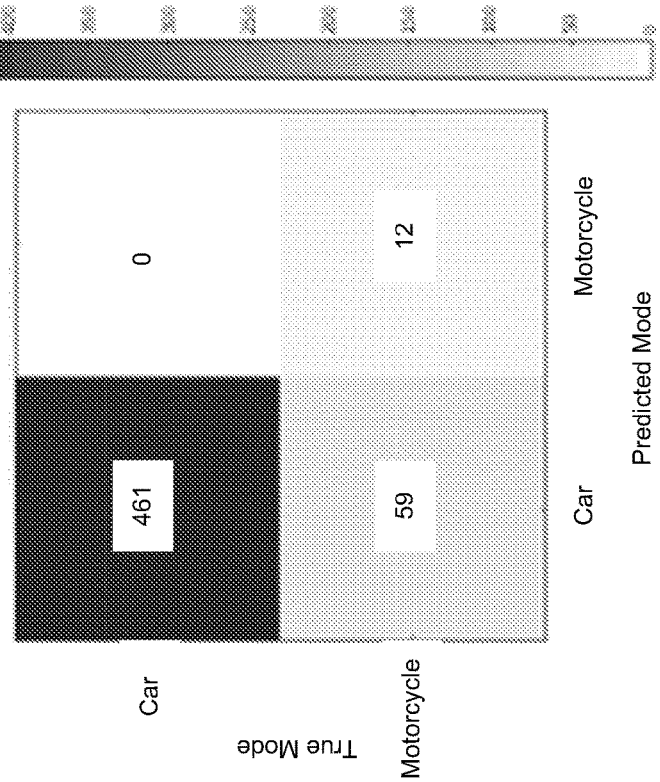
FIG. 14C
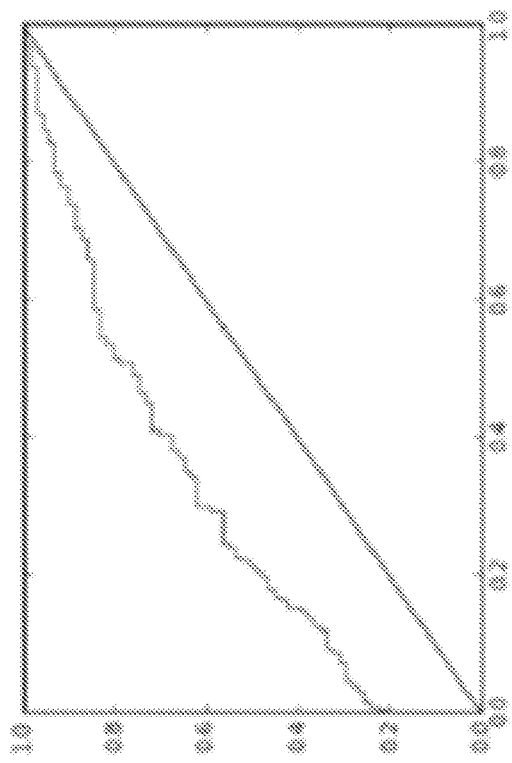
FIG. 14A
FIG. 14B

VEHICLE MODE DETERMINATION BASED ON EDGE-COMPUTING

CROSS-REFERENCE TO RELATED APPLICATIONS

The present application is a continuation and claims priority to U.S. patent application Ser. No. 16/843,959 filed on Apr. 9, 2020, which is incorporated by reference in its entirety herein.

FIELD OF ART

Aspects of the disclosure generally relate to methods and computer systems, including one or more computers particularly configured and/or executing computer software. More specifically, aspects of this disclosure relate to systems for vehicle mode determination based on edge-computing. In particular, vehicle data may be utilized to determine a type of the vehicle.

BACKGROUND

Determining vehicle mode is generally performed by collecting vehicle data from a vehicle and sending the vehicle data to a central server for processing. However, central processing may not take into account an amount of time the vehicle data may need to be collected, an amount and type of vehicle data to be collected, a number and types of features to be analyzed, and so forth. Also, for example, large amounts of data may need to be transmitted over networks. Generally, such techniques result is a loss of accuracy and an increase in the utilization of computing resources.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for vehicle mode determination based on edge-computing. In particular, based on vehicle data such as accelerometer data, gyroscopic data, and GPS data, a mode of transportation may be determined.

In some aspects, a vehicle mode determination system may include at least one processor and a memory unit storing computer-executable instructions. In some embodiments, the computer-executable instructions may be stored in one or more non-transitory computer-readable media. The vehicle mode determination system may be configured to, in operation, determine, by an on-board mobile computing device, whether a vehicular trip has been initiated. The vehicle mode determination system may, based on a determination that the vehicular trip has been initiated, cause one or more sensors to collect vehicle data, where the vehicle data may include at least one of: accelerometer data, gyroscope data, and GPS data. The vehicle mode determination system may, in operation, determine, by the mobile computing device, one or more trip segments for at least a portion of the vehicular trip. The vehicle mode determination system may, in operation, determine, by the mobile computing device and based on the accelerometer data and the gyroscope data and for each trip segment of the one or more trip segments, a first plurality of time features and a second plurality of frequency features. The vehicle mode determination system may, in operation, generate, by the mobile computing device and by concatenating the first plurality of time features and the second plurality of frequency features with a third plurality of GPS features, a feature vector. The vehicle mode determination system may be configured to, in operation, determine, by the mobile computing device and based on the feature vector, an accuracy measure. The vehicle mode determination system may be configured to, in operation, predict, based on the accuracy measure, a mode for the vehicle.

In other aspects, the vehicle mode determination system may also be configured to, in operation, determine a physical orientation of the on-board mobile device. In some aspects, the vehicle mode determination system may, in operation, adjust the accelerometer data based on the physical orientation.

In some aspects, the vehicle mode determination system may, in operation, adjust the gyroscope data by removing drift bias.

In some aspects, the vehicle mode determination system may, in operation, reduce, based on a principal component analysis of the feature vector, a number of components of the feature vector In some aspects, the vehicle mode determination system may, in operation, train, based on a support vector machine (SVM) classifier with a linear kernel, a machine learning model. In other aspects, the vehicle mode determination system may, in operation, determine, based on the machine learning model, a respective weight for one or more components of the feature vector.

In other arrangements, a threshold for a probability measure associated with a mode may be determined, and the mode may be determined by comparing the probability measure to the threshold.

In other aspects, the vehicle mode determination system may, in operation determine a stop time after the initiation of the vehicular trip, wherein the stop time is indicative of a time when the predicting for the mode may occur.

In other examples, the one or more steps may include, upon a determination of the mode, causing the one or more sensors to stop to collect the vehicle data.

In some example arrangements, the vehicle mode determination system may, in operation, perform a multimodal prediction.

In other aspects, the one or more steps may include, after prediction of the vehicle mode, determine whether the on-board mobile computing device is associated with a driver or a passenger of the vehicle.

In some arrangements, the vehicle mode determination system may, in operation, determine an optimal number of features to be used for the predicting of the vehicle mode.

In other aspects, the vehicle mode determination system may, in operation, determine, for each vehicle mode, an optimal number of trips to be used for the predicting of the vehicle mode.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIGS. 6A-6D illustrate example graphical representations of features in a bimodal case for vehicle mode determination based on edge-computing in accordance with one or more aspects described herein.

FIG. 8 illustrates example results of an SVM model for vehicle mode determination based on edge-computing in accordance with one or more aspects described herein.

FIGS. 9A-9C illustrate example graphical representations for a comparison of a car and a train for vehicle mode determination based on edge-computing in accordance with one or more aspects described herein.

FIGS. 11A-11C illustrate example graphical representations for a comparison of a car and a boat for vehicle mode determination based on edge-computing in accordance with one or more aspects described herein.

FIGS. 12A-12C illustrate example graphical representations for a comparison of a car and a bicycle for vehicle mode determination based on edge-computing in accordance with one or more aspects described herein.

FIGS. 14A-14C illustrate example graphical representations for a comparison of a car and a motorcycle for vehicle mode determination based on edge-computing in accordance with one or more aspects described herein.

DETAILED DESCRIPTION

Figure 1:
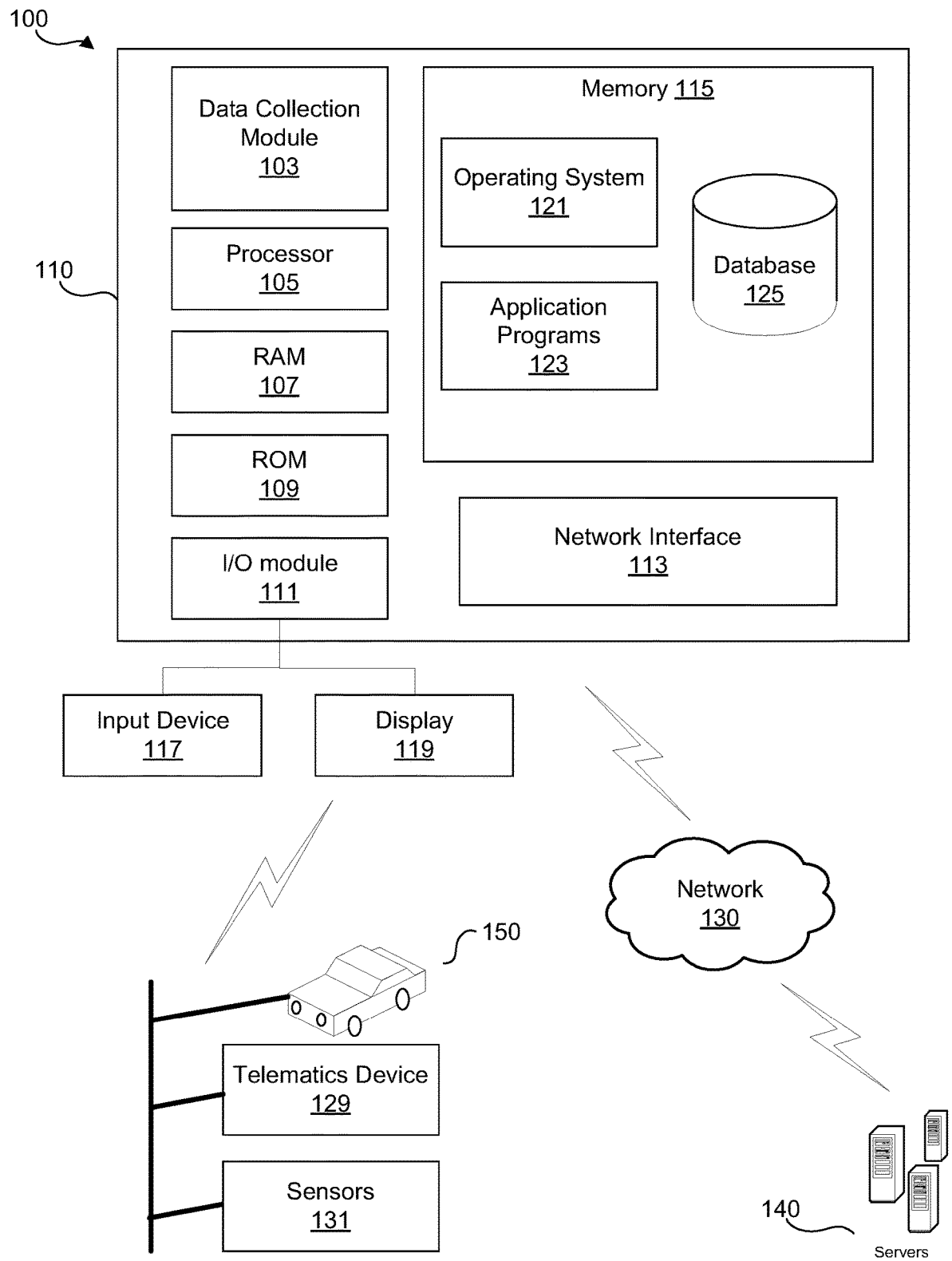
FIG. 1 illustrates an example computing environment for vehicle mode determination based on edge-computing that may be used in accordance with one or more aspects described herein.

In accordance with various aspects of the disclosure, methods, computer-readable media, software, and apparatuses are disclosed for predicting vehicle mode based on vehicle data. As described herein, arrangements for detecting a vehicle mode are described. The arrangements described may be based on vehicle data such as data received from an accelerometer, a gyroscope, a GPS device, and so forth. Instead of transmitting such data to a remote server for processing, the processes may be performed at an on-board device, such as, for example, a driver's mobile computing device. As described herein, performing edge-computing has considerable advantages to sending data to a remote server for processing.

Several types of preprocessing may be performed on the vehicle data, thereby improving a quality of the data used by a vehicle mode determination system. In some aspects, features may be extracted from the vehicle data. Also, for example, the features may be processed by transforming and scaling features, removing outliers, normalizing values, aggregating features at a trip level, and reducing a number of features. Also described herein are techniques to identify an optimal number of features, an optimal sample size for datasets for different vehicles, and/or an optimal time during a trip when the mode may be predicted with a high degree of accuracy. Such techniques enable an efficient use of computing resources, such as processing time, speed, and power, and also reduce an amount of memory usage. Also, for example, techniques described herein utilize a combination of features that may result in greater accuracy. As another example, by determining an optimal time during a trip when a prediction may be made with high accuracy, data collection itself may be ceased. Accordingly, an amount of data collected and processed is also decreased, improving computing functionality and reducing necessary computing resources.

Also, for example, techniques described herein bring together sensor technologies, signal processing techniques to process features, machine learning tools to design, build, analyze, debug, and deploy the system. Also, for example, a large trained data set is identified and utilized to train the machine learning models described herein.

For example, preprocessing techniques described herein may lead to higher accuracy of predicting the vehicle mode. Such preprocessing may include, for example, a sensor sample rate of 25 Hz, a segment length of 250 points, a transformation of taking the magnitude of both the three-axis accelerometer and gyroscope, a method of detecting gravity using a median filter, a method of removing bias from gyroscope by subtracting the 10th percentile, and utilizing a cutoff frequency of 9 Hz and filter type of Butterworth for lowpass filtering. Also, for example, techniques described herein include, for example, Also, for example, computing on the edge has several advantages. Generally, an average of 250 trip data may be received per second. This may require approximately 250 computing nodes to compute. To process such data at a central server would require a considerable amount of server capacity. In addition, to process data from approximately 20 million customers, another 250 computing nodes may be needed. Accordingly, a computational cost of processing on a central server increases substantially. However, edge-computing may reduce or remove such computational complexity.

Techniques described herein may enable an insurance provider to optimize its products based on a knowledge of vehicle mode. For example, an insured customer may be associated with various vehicle modes at various times. A type of vehicle used may be utilized to determine a driving score, an insurance premium, collision determination, and so forth.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, aspects of the present disclosure may be implemented with a computing device. FIG. 1 illustrates a block diagram of an example computing environment for vehicle mode determination based on edge-computing that may be used in accordance with one or more aspects described herein. The vehicle mode determination system 100 may be a computing device, such as a personal computer (e.g., a desktop computer), server, laptop computer, notebook, tablet, smartphone, etc. The vehicle mode determination system 100 may include a vehicle mode determination device 110, which may have a data collection module 103 for retrieving and/or analyzing data as described herein. The data collection module 103 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 103 may refer to the software and/or hardware used to implement the data collection module 103. In cases where the data collection module 103 includes one or more processors, such processors may be specially configured to perform the processes disclosed herein. Additionally, or alternatively, the data collection module 103 may include one or more processors configured to execute computer-executable instructions, which may be stored on a storage medium, to perform the processes disclosed herein. In some examples, vehicle mode determination device 110 may include one or more processors 105 in addition to, or instead of, the data collection module 103. The processor(s) 105 may be configured to operate in conjunction with data collection module 103. Both the data collection module 103 and the processor(s) 105 may be capable of controlling operations of the vehicle mode determination device 110 and its associated components, including RAM 107, ROM 109, an input/output (I/O) module 111, a network interface 113, and memory 115. For example, the data collection module 103 and processor(s) 105 may each be configured to read/write computer-executable instructions and other values from/to the RAM 107, ROM 109, and memory 115.

The I/O module 111 may be configured to be connected to an input device 117, such as a microphone, keypad, keyboard, touchscreen, and/or stylus through which a user of the vehicle mode determination device 110 may provide input data. The I/O module 111 may also be configured to be connected to a display device 119, such as a monitor, television, touchscreen, etc., and may include a graphics card. For example, the I/O module 111 may be configured to receive biometric data from a user. The display device 119 and input device 117 are shown as separate elements from the vehicle mode determination device 110; however, they may be within the same structure. On some vehicle mode determination devices 110, the input device 117 may be operated by a driver of a vehicle to interact with the data collection module 103, including providing information about road conditions, weather conditions, vehicle condition, route, and so forth, as described in further detail below. System administrators may use the input device 117 to make updates to the data collection module 103, such as software updates. Meanwhile, the display device 119 may assist the system administrators and users to confirm/appreciate their inputs.

The memory 115 may be any computer-readable medium for storing computer-executable instructions (e.g., software). The instructions stored within memory 115 may enable the vehicle mode determination system 100 to perform various functions. For example, memory 115 may store software used by the vehicle mode determination system 100, such as operating system 121 and application programs 123, and may include an associated database 125.

Although not shown in FIG. 1, various elements within memory 115 or other components in the vehicle mode determination system 100, may include one or more caches, for example, CPU caches used by the processing unit 105, page caches used by the display device 119, disk caches of a hard drive, and/or database caches used to cache content from database 125. For embodiments including a CPU cache, the CPU cache may be used by one or more processors in the processor 105 to reduce memory latency and access time. In such examples, the processor 105 may retrieve data from or write data to the CPU cache rather than reading/writing to memory 115, which may improve the speed of these operations. In some examples, a database cache may be created in which certain data from a central database such as, for example, one or more enterprise servers 140 (e.g., a map database, a customer database, driving history database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 140. These types of caches and others may be included in various embodiments, and may provide potential advantages in certain implementations of retrieving and analyzing vehicle data, such as faster response times and less dependence on network conditions when transmitting/receiving vehicle data from a vehicles 150 (e.g., from vehicle-based devices such as on-board vehicle computers, short-range vehicle communication systems, telematics devices 129, sensors 131), data from one or more enterprise servers 140, etc. Although telematics devices 129 and sensors 131 are shown to be associated with vehicles 150, telematics devices 129 and/or sensors 131 may be a part of data collection module 103. For example, when vehicle mode determination device 110 is integrated into a mobile computing device, telematics devices 129 and/or sensors 131 may be a part of data collection module 103 of the mobile computing device.

Vehicles 150 in the vehicle mode determination system 100 may be, for example, automobiles, trains, motorcycles, scooters, buses, recreational vehicles, boats, or other vehicles for which vehicle data may be collected and analyzed. In some embodiments, vehicles 150 may include sensors 131 capable of detecting and recording various conditions at the vehicle and operational parameters of the vehicle. For example, sensors 131 may detect and store data corresponding to the vehicle's location (e.g., GPS coordinates), speed and direction, rates of acceleration or braking, and specific instances of sudden acceleration, braking, and swerving.

Sensors 131 may include Global Positioning System (GPS) locational sensors positioned in vehicle mode determination device 110, and may be used to determine the route, lane position, and other vehicle position/location data. Sensors 131 may include an accelerometer and/or a gyroscope. For example, sensors 131 may include a three-axis 25 Hz accelerometer and gyroscope.

In some embodiments, the telematics device 129 may be a device that is plugged into the vehicle's on-board diagnostic (OBD) system (e.g., plugged in through an OBD II connector) or otherwise installed in a vehicle or a mobile computing device in order to collect vehicle data using, e.g., its accelerometer, GPS, gyroscope, or any other sensor (either in the telematics device or the vehicle, and/or a mobile computing device). As mentioned above, this driving data may include vehicle telematics data or any other data related to events occurring during a vehicle's trip. The vehicle may have a GPS installed therein, and therefore, the telematics device 129 may also collect GPS coordinates. Alternatively, the telematics device may include its own GPS receiver.

Further, the telematics device 129 may include multiple devices. For example, the telematics device 129 may include the vehicle's OBD system and other computers of the vehicle. The telematics device 129 may be configured to interface with one or more sensors 131. For example, the telematics device 129 may be configured to interface with sensors 131, which may collect driving data. The driving data collected by vehicle sensors 131 may be stored and/or analyzed within the vehicle, such as for example by a driving analysis computer integrated into the vehicle, and/or may be transmitted to one or more external devices. For example, vehicle data may be transmitted via a telematics device 129 to one or more remote computing devices, and/or other remote devices.

The network interface 113 may allow vehicle mode determination device 110 to connect to and communicate with a network 130. The network 130 may be any type of network, including a local area network (LAN) and/or a wide area network (WAN), such as the Internet, a cellular network, or satellite network. Through network 130, vehicle mode determination device 110 may communicate with one or more other computing devices such as a user devices (e.g., laptops, notebooks, smartphones, tablets, personal computers, servers, vehicles, home management devices, home security devices, smart appliances, etc.) associated with a driver of vehicles 150. Through network 130, vehicle mode determination device 100 may communicate with one or more enterprise servers 140 to exchange related information and data.

Network interface 113 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, network interface 113 may use various protocols, including TCP/IP, Ethernet, File Transfer Protocol (FTP), Hypertext Transfer Protocol (HTTP), etc., to communicate with user devices, and enterprise servers 140.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed, and the various computing devices and mobile device location and configuration system components described herein may be configured to communicate using any of these network protocols or technologies.

Although not shown in FIG. 1, vehicle mode determination device 110 may be configured, for example, as a TENSORFLOW LITE model, to begin with preprocessing the data, and end with a mode prediction. A TENSORFLOW LITE model is an open source deep learning model that enables computing on a mobile computing device. The input may be the raw accelerometer and gyroscope sensor data and the output may be the mode prediction. Also, for example, vehicle mode determination device 110 may be configured as a software development kit (SDK) so that the vehicle mode determination system 101 may be configured to run as an edge-computing system. For example, as a trip takes place, the SDK may send the vehicle data through the TENSORFLOW LITE model in 10 second intervals, the vehicle data may be processed, and vehicle mode determination system 101 may output a vehicle mode prediction which may then be received by the SDK from the TENSORFLOW LITE model and subsequently input into a payload. In particular, an entire pipeline, including deriving and subtracting gravity, other preprocessing, computing the discrete Fourier transform (DFT), feature calculation, and model inference may be implemented into a TENSORFLOW LITE model. The model may be provided on the SDK as described herein.

Figure 2:
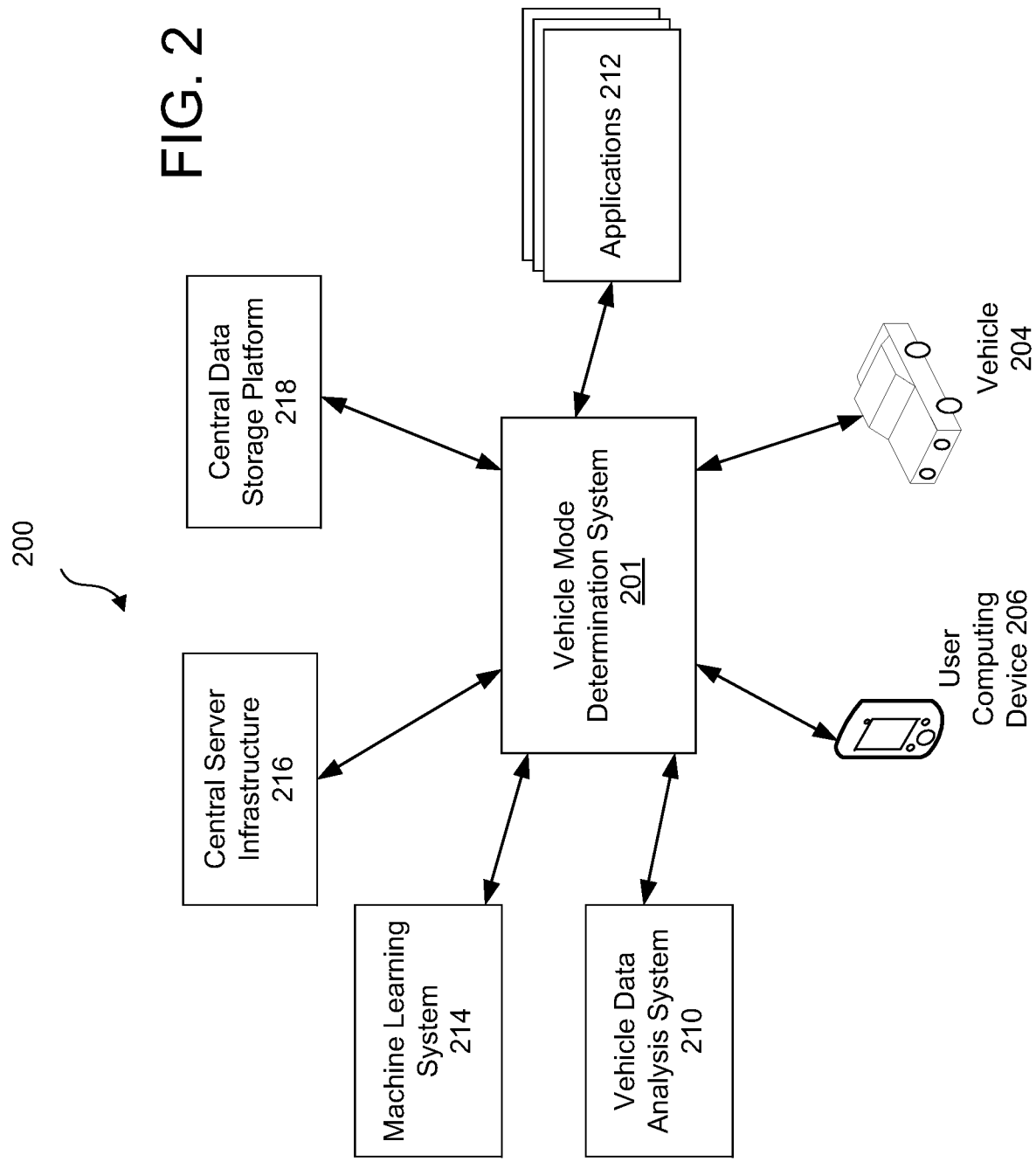
FIG. 2 shows a block diagram illustrating the system architecture for vehicle mode determination based on edge-computing in accordance with one or more aspects described herein.

FIG. 2 shows a block diagram illustrating system architecture 200 for vehicle mode determination based on edge-computing in accordance with one or more aspects described herein. A vehicle mode determination system 201 may receive vehicle data from a vehicle 204 and/or a user computing device 206 associated with a driver and/or passenger of vehicle 204. In some instances, the vehicle mode determination system 201 may be or include one or more components discussed with respect to a vehicle mode determination system 100, as shown in FIG. 1. In some instances, vehicle mode determination system 201 may be housed on vehicle 204 and/or user computing device 206. The vehicle 204 and/or user computing device 206 may be equipped with vehicle mode determination system 201 to perform the processes described herein, and may be equipped to communicate with devices, servers, databases, etc. over a network. In some embodiments, vehicle 204 and/or user computing device 206 may include a server, a network interface that facilitates communications over private and public networks. In some embodiments, vehicle mode determination system 201 may collect information from and transmit information to each of the various applications, databases, devices, and backend servers described in FIG. 2.

In some embodiments, vehicle mode determination system 201 may retrieve vehicle data from a computing device at a vehicle 204 and/or user computing device 206 associated with a driver and/or passenger of vehicle 204. For example, vehicle 204 may be equipped with a telematics device (e.g., an in-vehicle telematics device) that provides various telematics information to users and/or service providers regarding vehicle location, direction of travel, velocity, route, and/or destination. In some embodiments, vehicle mode determination system 201 may track a driver's location through telematics information. In some embodiments, an in-vehicle telematics device may include a processor with a display or graphical interface that receives and/or collects vehicle data and/or telematics information and provides additional information based on the vehicle data. The vehicle data and/or telematics information may include, but not be limited to: location, instantaneous velocity, average velocity, route, destination, braking, swerving, etc. The in-vehicle telematics device, which may be configured to receive real-time vehicle data, may provide vehicle mode determination system 201 with visual and/or audible in-vehicle information. In some embodiments, vehicle data may include biometric data for a driver of vehicle 204. For example, an electro-cardiogram meter ("ECG meter") in a steering wheel of vehicle 204 may identify a unique ECG signature for a driver of vehicle 204.

The telematics device may communicate with a data collection device or on-board diagnostics port of a vehicle to collect the vehicle data. In another example embodiment, the in-vehicle telematics device may acquire the vehicle data directly from a device, such as user computing device 206 (e.g., a smart phone, tablet computer, or vehicle navigation system via a built-in gyroscope, accelerometer and/or GPS, and so forth.

The vehicle data may be analyzed by vehicle data analysis system 210. For example, vehicle data analysis system 210 may analyze location data from vehicle 204 and/or user computing device 206 to identify a geographical location of vehicle 204 and/or user computing device 206. As another example, vehicle data analysis system 210 may analyze data related to velocity of vehicle 204 to determine if vehicle 204 is on a highway, a city road, a country road, rail tracks, a waterway, and so forth.

Applications 212 may be configured to determine a vehicle mode. For example, vehicle mode determination system 201 may utilize vehicle data related to gyroscope data, accelerometer data, GPS data, a route, origin, destination, and so forth, to determine a mode for vehicle 204. For example, applications 212 may include applications to preprocess vehicle data, generate features (e.g., frequency features, time features, GPS features), perform a discrete Fourier transform (DFT), a fast Fourier transform (FFT), and so forth. Also, for example, applications 212 may include applications to apply a principal component analysis (PCA) to a feature vector to reduce dimensionality.

Machine learning system 214 may be configured to learn various aspects of vehicle mode determination, and/or apply learned models to predict a vehicle mode. For example, machine learning system 214 may be configured to apply a support vector machine (SVM) classifier to identify a vehicle mode. Also, for example, machine learning system 214 may be configured to determine weights for various components of a feature vector.

Central server infrastructure 216 may be configured to host, execute, manage, and/or otherwise provide a computing platform for various computing devices and/or enterprise applications. In some instances, central server infrastructure 216 may be configured to provide various enterprise and/or back-office computing functions for an enterprise organization, such as an insurance organization, a financial institution, and so forth. For example, central server infrastructure 216 may include various servers that host applications that maintain, support, process, and/or provide account information associated with a user, such as driving history, driving patters, biometric data, financial account information, online activities and other account access data, and/or other information. Additionally, or alternatively, central server infrastructure 216 may receive instructions from vehicle mode determination system 201 and execute the instructions in a timely manner.

Central data storage platform 218 may be configured to store and/or otherwise maintain data, including account information associated with a user, such as vehicle data received from a vehicle and/or a user computing device, driving history, driving patterns, biometric data, insurance data, online activities and other account access data, and/or data otherwise provided by central server infrastructure 216. Also, for example, central data storage platform 218 may be configured to store and/or otherwise maintain information associated with probability distributions for vehicle modes. As another example, central data storage platform 218 may be configured to store and/or otherwise maintain geolocation profiles for individuals. Additionally, or alternatively, central server infrastructure 216 may load data from central data storage platform 218, manipulate and/or otherwise process such data, and return modified data and/or other data to central data storage platform 218.

Although vehicle data analysis system 210, applications 212, machine learning system 214, central server infrastructure 216, and central data storage platform 218 are shown as separate elements from vehicle mode determination system 201, one or more of them may be within the same structure.

Figure 3:
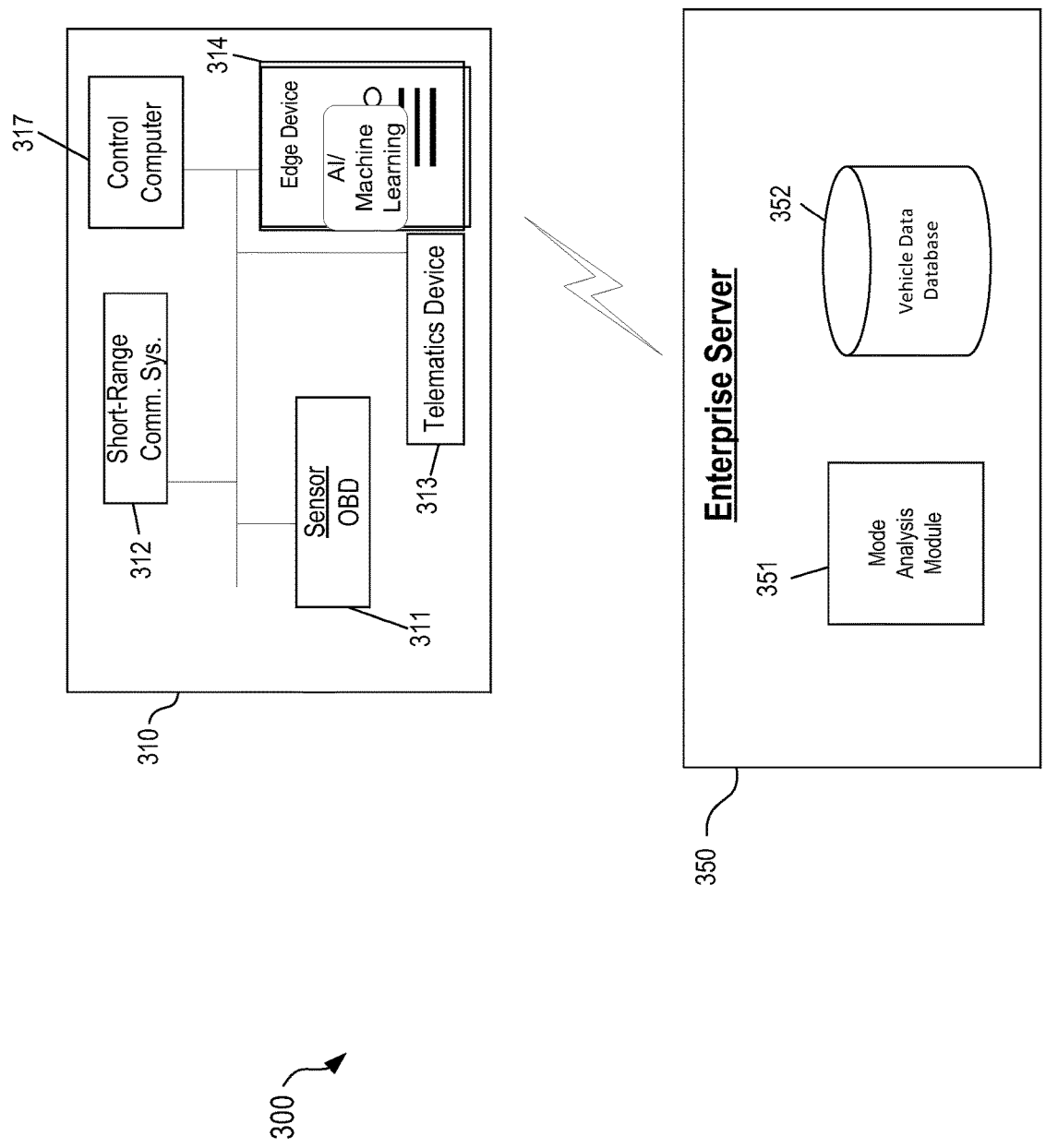
FIG. 3 illustrates a block diagram for vehicle mode determination based on edge-computing in accordance with one or more aspects described herein.

FIG. 3 illustrates a block diagram for vehicle mode determination based on edge-computing in accordance with one or more aspects described herein. FIG. 3 is a diagram including vehicle 310, a remote server or mode analysis server (e.g., enterprise server 350), and additional related components. Each component shown in FIG. 3 may be implemented in hardware, software, or a combination of the two. Additionally, each component of the driving analysis system 300 may include a computing device (or system) having some or all of the structural components described above for computing device 101.

Vehicle 310 in the vehicle mode determination system 300 may be, for example, automobiles, motorcycles, scooters, buses, recreational vehicles, boats, or other vehicles for which a vehicle data may be collected and analyzed. The vehicle 310 may include sensors 311 capable of detecting and recording various conditions at the vehicle. For example, sensors 311 may detect and store data corresponding to the vehicle's location (e.g., GPS coordinates), speed and direction, rates of acceleration or braking, and specific instances of sudden acceleration, braking, and swerving. Generally, such data may not need to be transmitted to enterprise server 350, and may be processed locally via edge-computing functionality.

Certain sensors 311 also may collect information regarding the driver's route choice, whether the driver follows a given route, and to classify the type of trip (e.g. commute, errand, new route, etc). AI/Machine Learning models housed at edge device 314 may deduce driver specific patterns, behaviors, and so forth. The data collected by sensors 311 may be stored and/or analyzed within the vehicle 310, such as for example control computer 317 integrated into the vehicle. 310.

Short-range communication system 312 may be a vehicle-based data transmission system configured to transmit vehicle data to other on-board computing devices (e.g., a mobile device of a driver and/or a passenger). In some examples, communication system 312 may use dedicated short-range communications (DSRC) protocols and standards to perform wireless communications between vehicles. In certain systems, short-range communication system 312 may include specialized hardware installed in vehicle 310 (e.g., transceivers, antennas, etc.), while in other examples the communication system 312 may be implemented using existing vehicle hardware components (e.g., radio and satellite equipment, navigation computers).

The types of vehicle data, may include data such as the location (which may include an absolute location in GPS coordinates or other coordinate systems, and/or a relative location with respect to another vehicle or a fixed point), speed, and direction of travel. The vehicle data may also relate to a state or usage of the vehicle 310 controls and instruments, for example, whether the vehicle is accelerating, braking, turning, and by how much, and/or which of the vehicle's instruments are currently activated by the driver (e.g., cruise control, 4-wheel drive, traction control, etc.).

Telematics devices 313 may be computing devices containing many or all of the hardware/software components as the computing device 110 depicted in FIG. 1. As discussed above, the telematics devices 313 may receive vehicle data from sensors 311, and may transmit the data to one or more external computer systems (e.g., a remote server or mode analysis server (e.g., enterprise server 350) of an insurance company, financial institution, or other entity) over a wireless transmission network. Telematics devices 313 also may be configured to detect or determine additional types of data relating to real-time driving of the vehicle 310. In certain embodiments, the telematics devices 313 may contain or may be integral with one or more of the sensors 311.

In certain embodiments, edge device 314 within the vehicle 310 may be configured to communicate with, for example, mobile phones, personal digital assistants (PDAs), or tablet computers of the drivers or passengers of vehicle 310. As described herein, one or more components illustrated in vehicle 310 may be integrated int a mobile computing device, such as a user computing device of a passenger in vehicle 310. Software applications executing on edge device 314 may be configured to detect certain vehicle data independently and/or may communicate with sensors 311 to receive additional driving data. For example, edge device 314 equipped with GPS functionality may determine vehicle location, speed, direction and other basic vehicle data without needing to communicate with sensors 311, or any vehicle system. In other examples, software on the edge device 314 may be configured to receive some or all of the vehicle data collected by sensors 311.

When edge device 314 within the vehicle 310 is used to detect vehicle data and/or to receive vehicle data from sensors 311, the edge device 314 may store, and/or analyze, the vehicle data without further transmission to other devices. Moreover, the processing components of the edge device 314 may be used to analyze vehicle data, determine vehicle characteristics, and perform other related functions.

Edge device 314, may be a separate computing device or may be integrated into one or more other components within the vehicle 310, such as telematics devices 313, or the control computer 317. As discussed above, edge device 314 also may be implemented by computing devices independent from the vehicle 310, such as mobile computing devices of the drivers or passengers. In any of these examples, the edge device 314 may contain some or all of the hardware/software components as the computing device 101 depicted in FIG. 1.

Edge device 314 may be implemented in hardware and/or software configured to receive vehicle data from sensors 311, short-range communication system 312, telematics devices 313, control computer 317 and/or other driving data sources. The edge device 314 may comprise an electronic receiver to interface with the vehicle data acquiring components to receive the collected data. After receiving, via the electronic receiver, the vehicle data, the edge device 314 may perform a set of functions to analyze the driving data, and determine vehicle characteristics. For example, the edge device 314 may include one or more driving characteristic algorithms, which may be executed by software running on generic or specialized hardware within the driving analysis computers.

The system 300 also may include a remote server or mode analysis server (e.g., enterprise server 350), containing some or all of the hardware/software components as the computing device 101 depicted in FIG. 1. The remote server or mode analysis server (e.g., enterprise server 350) may include hardware, software, and network components to receive vehicle data/driving data from one or more vehicles 310, and other data sources. The remote server or mode analysis server (e.g., enterprise server 350) may include a vehicle data database 352 and mode analysis module 351 to respectively store and analyze driving data received from vehicles and other data sources. The remote server or mode analysis server (e.g., enterprise server 350) may initiate communication with and/or retrieve vehicle data from vehicle 310 wirelessly via telematics devices 313, over one or more computer networks (e.g., the Internet). Additionally, the remote server or mode analysis server (e.g., enterprise server 350) may receive additional data relevant to vehicle characteristic or other determinations from other non-vehicle data sources, such as external traffic databases containing traffic data (e.g., amounts of traffic, average driving speed, traffic speed distribution, and maps, etc.) at various times and locations, external weather databases containing weather data (e.g., rain, snow, sleet, and hail amounts, temperatures, wind, road conditions, visibility, etc.) for the vehicle, and/or driver.

Data stored in the vehicle data database 352 may be organized in any of several different manners. For example, a table in database 352 may contain all of the vehicle operation data for a specific vehicle 310, similar to a vehicle event log. Other tables in the database 352 may store certain types of data for multiple vehicles and types of vehicles, such as a bus, train, boat, bicycle, motorcycle, etc. For instance, tables may store specific data sets, including correlations related to the vehicle for use in determining vehicle mode and/or properties related to, for example, vehicle type.

The mode analysis module 351 within the remote server or mode analysis server (e.g., enterprise server 350) may be configured to retrieve data from vehicle data database 352, or may receive driving data directly from vehicle 310 or other data sources, and may perform mode data analyses, vehicle characteristic determinations, and other related functions. The functions performed by the mode analysis module 351 may be similar to those of edge device 314.

In various examples, the vehicle data analyses, vehicle mode determination, and so forth, may be performed in the mode analysis module 351 of the remote server or mode analysis server (e.g., enterprise server 350) (in which case edge device 314 may be updated periodically with results of such analysis). In other examples, certain driving data analyses may be performed by edge device 314, while other vehicle data analyses are performed by the mode analysis module 351 at the remote server or mode analysis server (e.g., enterprise server 350). For example, an edge device 314 may continuously receive and analyze vehicle data to determine certain vehicle characteristics so that large amounts of vehicle data need not be transmitted to the remote server or mode analysis server (e.g., enterprise server 350). However, for example, after vehicle mode is determined by the edge device 314, the mode may be transmitted to the server 350, and the mode analysis module 351 may determine if vehicle mode for a driver should be updated based on the determined vehicle mode.

Figure 4:
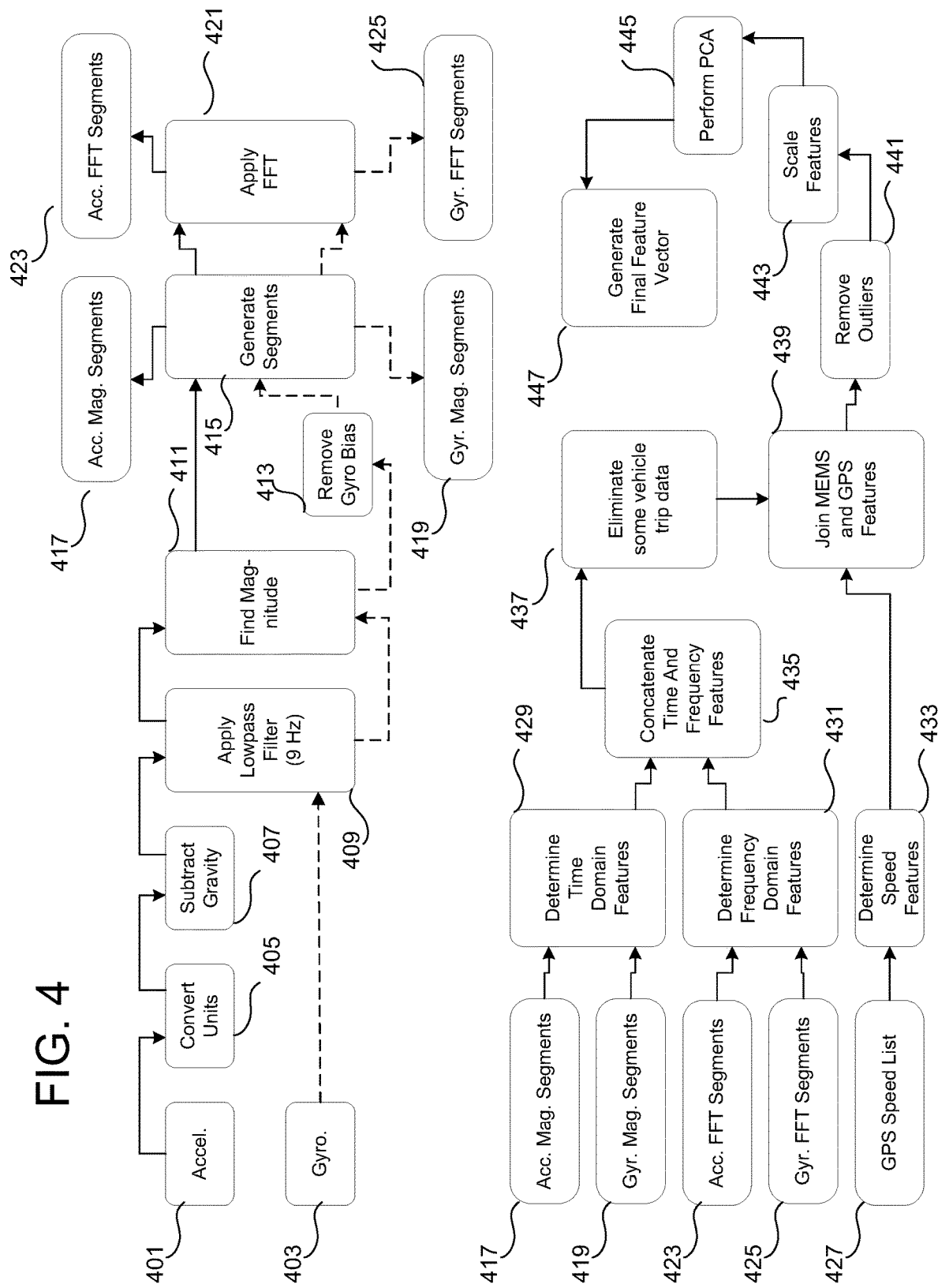
FIG. 4 illustrates an example block diagram for determining a feature vector for vehicle mode determination based on edge-computing in accordance with one or more aspects described herein.

FIG. 4 illustrates an example block diagram for determining a feature vector for vehicle mode determination based on edge-computing in accordance with one or more aspects described herein in accordance with one or more aspects described herein.

In some embodiments, vehicle mode determination system 201 may determine, by an on-board mobile computing device, whether a vehicular trip has been initiated. For example, vehicle mode determination system 201 may receive data from telematics devices that the vehicle has started to move from a stationary position. Additional data, such as GPS data, and/or location data, preferred locations for the vehicle, and so forth, may be utilized to determine if a trip has started. For example, a motion at 20 mph for a certain time may triggers a trip start. Also, for example, a trip end may be detected when a detected motion is below 12 mph for a certain amount of time (e.g. 10 min). In some embodiments, a trip start may also be based on a geofence.

For example, vehicle mode determination system 201 may record a last location for a trip end. Subsequently, vehicle mode determination system 201 may measure a distance from the recorded last location. Upon a determination that the distance from the last location exceeds a threshold value (e.g., a geofence), vehicle mode determination system 201 may determine that a new trip has been initiated. In some embodiments, vehicle mode determination system 201 may detect a certain speed for a certain amount of time to confirm that a new trip has been initiated. Based upon such analysis, vehicle mode determination system 201 may determine that a geofence has been broken. Also, for example, vehicle mode determination system 201 may adjust for traffic lights, stop signs, train stops etc. to determine a trip end.

In some embodiments, vehicle mode determination system 201 may, based on a determination that the vehicular trip has been initiated, cause one or more sensors to collect vehicle data, where the vehicle data comprises at least one of: accelerometer data, gyroscope data, and GPS data. Referring to FIG. 4, in some embodiments, vehicle mode determination system 201 may collect the acceleration data 401 from the accelerometer of an on-board user computing device, and collect the gyroscope data 403 from the gyroscope of the on-board user computing device. In some embodiments, vehicle data may be received from micro-electro-mechanical systems (MEMS) sensors. For example, MEMS accelerometer may be a variable capacitive device that is a low range, high sensitivity device utilized for constant acceleration measurements. Also, for example, MEMS gyroscopes may be devices that measure an angular displacement of an object. MEMS data may also be collected via a gravitometer, and a barometer.

In some embodiments, vehicle mode determination system 201 may preprocess the vehicle data. For example, collected acceleration data 401 and collected gyroscope data 403 from different operating systems of different computing devices may be in different units of measurement. For example, iOS® and ANDROID devices generally have different units for measuring collected acceleration data 401 and collected gyroscope data 403. Accordingly, at block, 405, vehicle mode determination system 201 may convert collected data to a common unit of measurement.

At block 407, vehicle mode determination system 201 may determine an acceleration for the vehicle by subtracting acceleration due to gravity from collected acceleration data 401. In some embodiments, vehicle mode determination system 201 may determine a physical orientation of the on-board mobile device. In some embodiments, vehicle mode determination system 201 may adjust the accelerometer data based on the physical orientation. For example, a mobile device in a vehicle may be oriented in a manner such as the only component of gravity is directed vertically downward. In such instances, the magnitude of gravity may be directly subtracted from the acceleration value to determine the vehicle's acceleration. However, if the mobile device is oriented in a different manner, gravity may comprise three components. In some embodiments, a gravity sensor may record gravity values at a first set of times (recorded as timestamps), and the accelerometer may record values at a second set of times different from the first set of times. Accordingly, data from the two sensors may not be synchronized. In some embodiments, vehicle mode determination system 201 may resample these data values to 25 Hz, align the resulting data values on the two sets of times, and then subtract these values from the recorded values at those times.

At block 409, vehicle mode determination system 201 may apply a low pass filter (e.g., with a threshold of 9 Hz) to filter out high frequency components of collected acceleration data values and collected gyroscope data values. Generally, a type of filter may impact accuracy in determining a vehicle mode. As described herein, a maximally flat magnitude filter, such as, for example, a Butterworth filter, may be utilized. Such a filter includes a set of filter coefficients, and is an infinite impulse response (IIR) filter. Accordingly, an output from a previous timestamp may be filtered into a next timestamp. Also, for example, frequency values utilized herein are up to 9 Hz; accordingly a threshold for the filter may be set at 9 Hz.

At step 411, a magnitude of collected acceleration data values and collected gyroscope data values may be determined based on values of the respective components along the x-, y-, and z-axes. For example, values of x-, y-, and z-components may be squared, summed, and a square root of the resulting value may be taken to determine a magnitude. Additional, and/or alternate means of determining a magnitude may be utilized.

In some embodiments, at block 413, vehicle mode determination system 201 may adjust the gyroscope data by removing drift bias. Generally, a gyroscope may measure an amount of motion over time. Also, for example, a gyroscope may drift over time. Generally, MEMS data is collected in segments of time. For each ten (10) second segment of data, vehicle mode determination system 201 may take a $10^{th}$ percentile of a gyroscope value and subtract that from the overall value. Such a zero-balance error adjustment may remove the drift bias from gyroscope data values.

As described herein, MEMS data may be collected in segments of time. However, GPS speed data may be associated with an entire trip. Accordingly, vehicle mode determination system 201 may process MEMS data such as accelerometer data and gyroscope data, in a different way than GPS data. In some embodiments, at block 415, vehicle mode determination system 201 may determine one or more trip segments for at least a portion of the vehicular trip. For example, a segment may be five (5), ten (10), fifteen (15) seconds long. For example, vehicle mode determination system 201 may utilize data with 10 second time segments.

At block 417, a graphical representation for accelerometer magnitude values, the horizontal axis may represent time, and the vertical axis may represent change in acceleration magnitude values over time. Likewise, at block 419, a graphical representation for gyroscopic magnitude values, the horizontal axis may represent time, and the vertical axis may represent change in gyroscopic magnitude values over time.

At block 421, frequency components of the signal may be determined. In some embodiments, a fast Fourier transform (FFT) may be applied. For example, in a graphical representation, the horizontal axis may represent a frequency, and the vertical axis may represent an amount of signal (for acceleration values, gyroscopic values) that occurs at that frequency. For example, when a car is in motion and goes over bumps in the road, a passenger in the car may experience motion in the range of a frequency of 2 Hz. Accordingly, an FFT may depict a large spike at 2 Hz. As another example, a train may travel fast and a passenger in the train may experience motion in the range of a frequency of 10 Hz. Accordingly, an FFT may depict a large spike at 10 Hz. Accordingly, based on the frequency values vehicle mode determination system 201 may determine a difference between car and a train. At block 423, frequency values for acceleration data may be determined, and at block 425, frequency values for gyroscopic data may be determined.

Generally, a length of a segment may vary based on the incoming vehicle data. Also, for example, a trip may be divided into time segments of the same length, or varying lengths. In some embodiments, a machine learning model may be trained to determine a length of a segment, whether the segment length may remain of fixed length, or variable length, and so forth. In some embodiments, vehicle mode determination system 201 may determine a stop time after the initiation of the vehicular trip, where the stop time is indicative of a time when the predicting for the mode may occur. For example, based on a type of vehicle, a prediction for the mode may vary. In some instances, data from an entire trip may not be needed to predict the mode.

Figure 5:
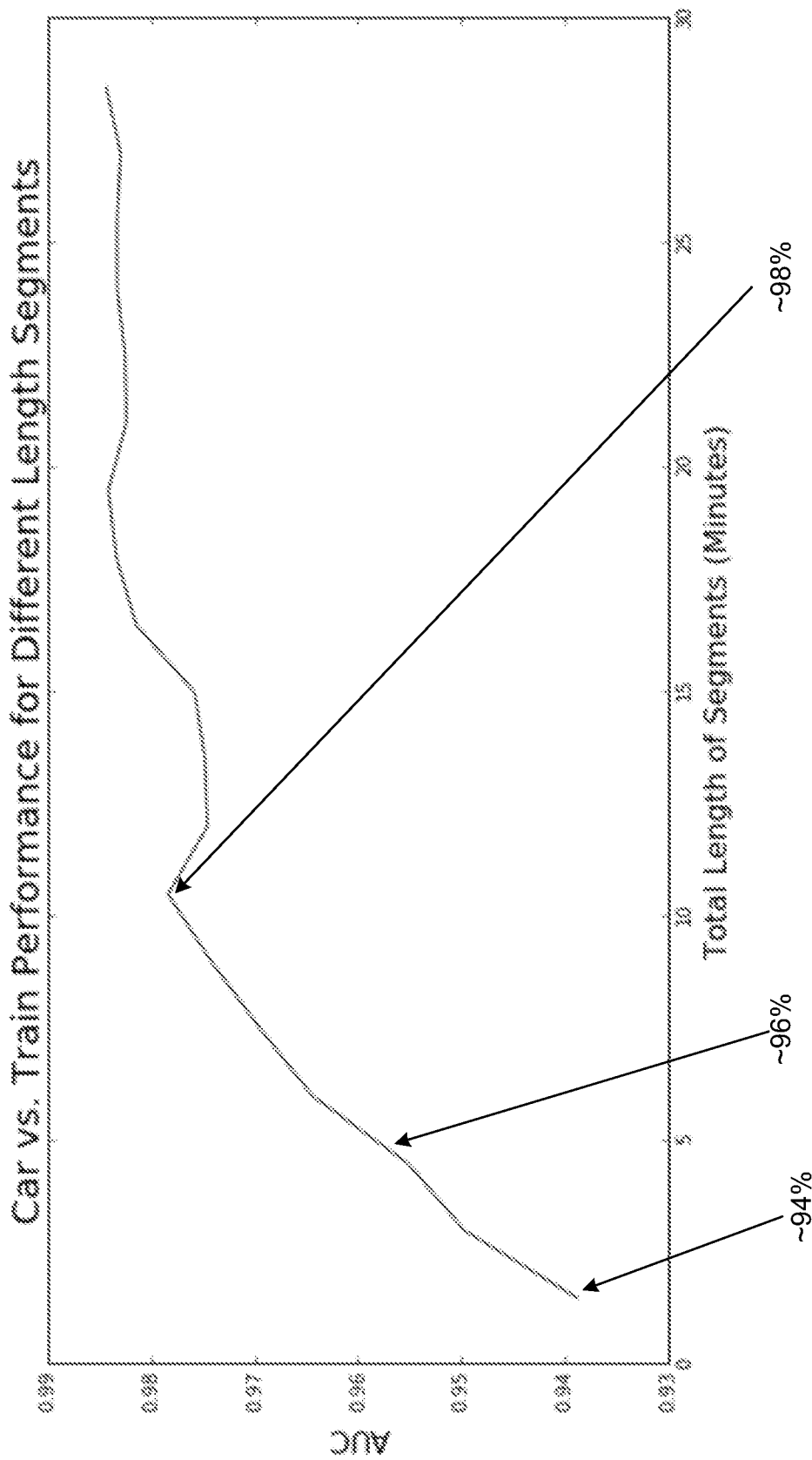
FIG. 5 illustrates an example graphical representation to select time segments in vehicle mode determination based on edge-computing in accordance with one or more aspects described herein.

FIG. 5 illustrates an example graphical representation to select time segments in vehicle mode determination based on edge-computing in accordance with one or more aspects described herein in accordance with one or more aspects described herein. Referring to FIG. 5, the horizontal axis indicates a total length of segments measured in minutes, and the vertical axis represents area under the curve (AUC) values ranging from 0.93 to 0.99. Generally, AUC values may be utilized as a performance measurement for a classification problem. In this example, the classification is between a prediction that the mode is a car and a prediction that the mode is a train. As indicated, at one (1) minute, the AUC value is 0.94 (or 94%), at five (5) minutes, the AUC value is closer to 0.96 (or 96%), and at ten (10) minutes, the AUC value is at 0.98 (or 98%). Accordingly, after 10 minutes of the trip, vehicle mode determination system 201 may make a prediction with a high degree of certainty. Accordingly, vehicle mode determination system 201 may not need additional data after an initial segment of a trip. For example, an average length of a car trip may be twenty (20) minutes, and vehicle data from an initial 7-10 minutes may allow vehicle mode determination system 201 to predict the mode.

In some embodiments, vehicle mode determination system 201 may, upon a determination of the mode, cause the one or more sensors to stop collecting the vehicle data. For example, vehicle mode determination system 201 may not need additional data after an initial segment of a trip. As in the previous example, in a trip in a car, vehicle mode determination system 201 may predict the mode in the first 7-10 minutes of the trip. Accordingly, vehicle mode determination system 201 may cause the sensors and/or telematics devices to stop collecting additional data for mode determination. Generally, this may save computing resources related to data collection, pre-processing, processing, analyzing, computations, data transmissions to central servers, and so forth. In some embodiment, data collection may be activated and/or deactivated by a remote server (e.g., enterprise server 350).

In some embodiments, vehicle mode determination system 201 may determine, by the mobile computing device and based on the accelerometer data and the gyroscope data and for each trip segment of the one or more trip segments, a first plurality of time features and a second plurality of frequency features. For example, with further reference to FIG. 4, at block 429, vehicle mode determination system 201 may determine time domain features for the acceleration magnitude values from block 417, and the gyroscope magnitude values from block 419. Such time domain features may include, for example, a frequency with a highest FFT value, a mean of the values, a standard deviation of the values, a discrete cosine (DC) transform applied to FFT, a sum and standard deviation in a frequency range of 0-2 Hz, a ratio between energy in frequency 0-2 Hz and frequency in the entire band. In some embodiments, vehicle mode determination system 201 may determine time domain features such as a sum and standard deviation in a frequency range of 2-4 Hz, a ratio between energy in frequency 2-4 Hz and frequency in the entire band. Similarly, vehicle mode determination system 201 may determine time domain features such as a sum and standard deviation for frequency ranges of 0-1 Hz, 1-3 Hz, 3-5 Hz, 5-16 Hz, and a ratio between energy in these frequency ranges and the frequency in the entire band.

Also, for example, at block 431, vehicle mode determination system 201 may determine, for each trip segment of the one or more trip segments, frequency domain features for the acceleration FFT values from block 423, and the gyroscope FFT values from block 425. Such frequency domain features may include, for example, a mean of the values, a standard deviation of the values, a mean crossing rate, determinations of energy, kurtosis, skew, minimum and maximum values, a median, a range, a third quartile, a squared sum over quartiles 5, 25, 50, 75, and 90, and an interquartile range.

FIGS. 6A-6D illustrate example graphical representations of features in a bimodal case for vehicle mode determination based on edge-computing in accordance with one or more aspects described herein in accordance with one or more aspects described herein. Referring to FIG. 6A, an example graphical representation is provided for a ratio between energy in frequency 0-2 Hz and frequency in the entire band for accelerometer data. The horizontal axis shows frequency values in the range 0.40 to 0.65, and the vertical axis shows probability values in the range 0 to 0.16. The earlier spike (high probability or p(x) value of 0.14) for the train depicts a highly probable value for the train, at a value of x at 0.45. Likewise, a later spike (high probability or p(x) value of 0.13) for the car depicts a highly probable value for the car, at a value of x at 0.52. The frequency measures oscillations while in motion. So for the car, the suspension is generally low enough that it may mimic walking, so the average ratio is higher and occurs at 0.52. A lower ratio may generally correspond to a smoother ride (e.g., with less movement of a passenger in a vehicle). Accordingly, a lower average ratio of 0.45 for the train illustrates a train ride may be generally smoother compared to a car ride.

Also, for example, different frequency bands may be needed as each vehicle may provide different frequency features in different bands. For example, as illustrated in FIG. 6C, an example graphical representation is provided for a ratio between energy in frequency 2-4 Hz and frequency in the entire band for accelerometer data. As illustrated, the data for a car shows an earlier spike than the data for the train (as compared to the measurements in the range 0-2 Hz illustrated in FIG. 6A). For example, the horizontal axis shows frequency values in the range 0.11 to 0.18, and the vertical axis shows probability values in the range 0 to 0.50. An earlier spike (high probability or p(x) value of 0.47) for the car depicts a highly probable value for the car, at a value of x at 0.135. Likewise, a later spike (high probability or p(x) value of 0.44) for the train depicts a highly probable value for the train, at a value of x at 0.145.

Referring to FIG. 6B, an example graphical representation is provided for GPS values in the 95$^{th}$ percentile. The horizontal axis shows speed values in the range 10 mph to 80 mph, and the vertical axis shows probability values in the range 0 to 0.045. The earlier spike (high probability or p(x) value of 0.043) for the car depicts a highly probable value for the car, at a value of x at 45 mph. Likewise, a later spike (high probability or p(x) value of 0.045) for the train depicts a highly probable value for the train, at a value of x at 65 mph. As a car is generally expected to travel slower than a train, the spoke in the probability at a lower speed is indicative of that.

Referring to FIG. 6D, an example graphical representation is provided for mean cross rates (MCR) values for acceleration data are shown. The horizontal axis shows MCR values in the range 0.15 to 0.35, and the vertical axis shows probability values in the range 0 to 0.12. Generally, MCR is indicative of how many times acceleration values cross over the mean value. This may represent a number of times a vehicle accelerates and decelerates. Generally, a car may have more MCR values and a train may have less MCR values. As illustrated in FIG. 6D, an earlier spike (high probability or p(x) value of 0.31) for the car depicts a highly probable value for the car, at a value of x at 0.24. Likewise, a later spike (high probability or p(x) value of 0.31) for the train depicts a highly probable value for the train, at a value of x at 0.29.

In some embodiments, with further reference to FIG. 4, vehicle mode determination system 201 may utilize the time domain features at block 429 and generate a feature list for each trip segment of the one or more trip segments. Likewise, vehicle mode determination system 201 may utilize the frequency domain features at block 431 and generate a feature list for each trip segment of the one or more trip segments. In some embodiments, a feature list may be generated by averaging the feature lists over all the trip segment. At step 435, the time domain features and the frequency domain features may be concatenated.

In some embodiments, the dataset may be normalized. For example, a large amount of data is obtained from cars. Accordingly, statistical results may be expected to be skewed toward cars. In some embodiments, vehicle mode determination system 201 may, at step 437, remove some data from cars. For example, the dataset may be semi-balanced by removing many car trips. For the multimodal model the resulting ratio of trips for car, train, and bus may be 8:2:1 respectively. Outliers may be removed by removing trips that have at least one feature with a z-value above 2. The data may be split into an 80:20 training-test split where trips corresponding to the same user are either in the training set or the test set, but not both. This may avoid overtraining the model, and reduce internal bias in the prediction algorithm.

In some embodiments, vehicle mode determination system 201 may perform such normalization for different datasets. For example, in Chicago, the dataset may comprise a large amount of data from train trips. In such an instance, data from car trips may not be removed. However, data from train trips may be removed. Also, for example, different datasets may be used for different vehicle modes. For example, boat trips may be much fewer, and so the prediction algorithm may be skewed to not predict boat trips. Accordingly, vehicle mode determination system 201 may collect data and label such data with an associated mode. Such labeled data may be utilized to train a machine learning model. Also, for example, as enough labeled data is collected over time, different machine learning models may be trained and utilized for predicting different modes.

At block 427, a GPS speed list may be determined. As described herein, although MEMS data, such as accelerometer data and gyroscopic data, may be provided in segments, GPS data is provided for an entire trip. Also, for example, GPS data may vary widely over different geographic regions (e.g., rural, urban, etc.). However, time and frequency feature show less variation over geographic regions. A GPS speed list may be, for example, speeds of 20, 25, 30, 30, 25, 10 for a trip.

At block 433, vehicle mode determination system 201 may determine GPS speed features based on the GPS speed list from block 427. Such GPS features may include, for example, a mean and standard deviation of the values in the GPS list, a range, interquartile range, a maximum, a quantile at 25, a quantile at 75, a quantile at 95, a kurtosis, and a skewness.

It may be generally noted that while various statistical computations used herein may be known, at least a manner in which data is processed, and a number and types of features is determined, as described in blocks 401-433, provide a unique and advantageous combination of tools that enable a fast, efficient, and reliable means for vehicle mode determination system 201 to predict the vehicle mode.

In some embodiments, vehicle mode determination system 201 may generate, by concatenating the first plurality of time features and the second plurality of frequency features with a third plurality of GPS features, a feature vector. For example, at step 439, the concatenated frequency feature and time features, suitably normalized, may be concatenated with the GPS to form one concatenated feature vector. In some embodiments, even though GPS features may be for an entire trip, vehicle mode determination system 201 may utilize intermediate time intervals to predict the mode during a trip (e.g., 6-7 minutes into the trip).

In some embodiments, some outlier data values may be removed. For example, z-values may be determined. Data values above a certain threshold z-value may be indicative of data values that are removed from a mean of a normal distribution. Accordingly, at step 441, such data values may be determined to be outliers for the distribution, and removed from the data set. Also, for example, different thresholds for z-values may be utilized for different modes. In some embodiments, for example at step 443, the feature list may be normalized so that each component of the feature list has a value in the range of 0 to 1.

In some embodiments, at step 445, vehicle mode determination system 201 may reduce, based on a principal component analysis (PCA) of the feature vector, a number of components of the feature vector. For example, the concatenated feature vector may have 40 components However, vehicle mode determination system 201 may predict the mode based on a subset of the 40 components, for example, 3 components. Generally, the subset of the components may be selected so as to represent the values in all the components. For example, the three components may be values that are summations of the values of the 40 components. Generally, a PCA application may be provided with N components, and it may provide k principal components. To find the k principal components, PCA may utilize all the components, a subset of them, and so forth. PCA analysis as described herein is unique in the way features are combined to obtain the feature vector. Also, for example, PCA results in a reduction in storage resources needed, and a large number of components are not utilized for further analysis. As described herein, vehicle mode determination system 201 utilizes a model based on matrix multiplication, and reduction in the number of components results a reduction in matrix size, thereby resulting in increased efficiencies in utilization of computing resources. Also, for example, such a reduction is another reason why the prediction may be performed by an edge-device.

Figure 7:
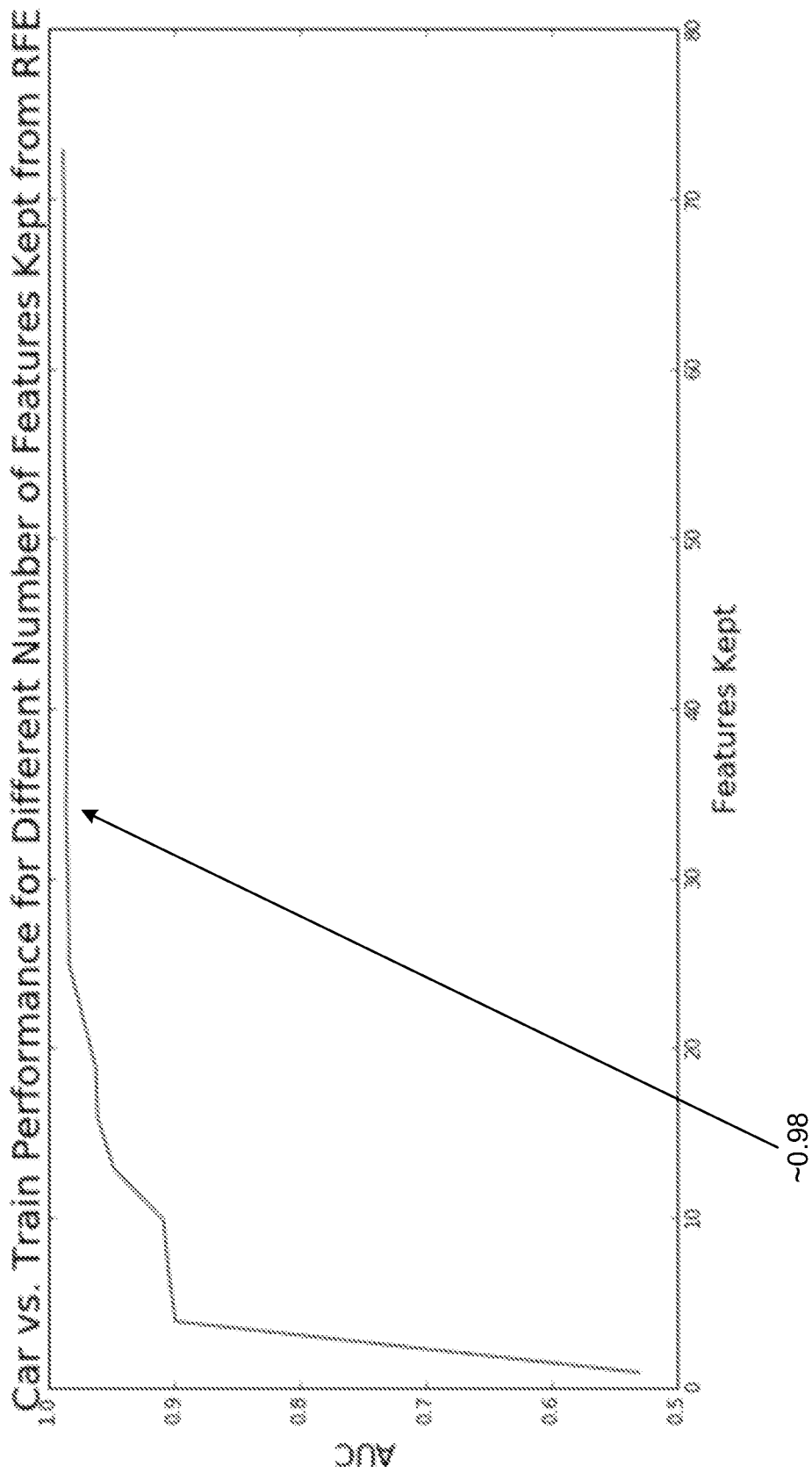
FIG. 7 illustrates an example graphical representation to select a number of features in vehicle mode determination based on edge-computing in accordance with one or more aspects described herein.

In some embodiments, vehicle mode determination system 201 may determine an optimal number of features to be used for the predicting of the vehicle mode. FIG. 7 illustrates an example graphical representation to select a number of features in vehicle mode determination based on edge-computing in accordance with one or more aspects described herein in accordance with one or more aspects described herein. The horizontal axis indicates a number of features used, and the vertical axis indicates a determined AUC value. As indicated, after 30-40 features are used, AUC value is high at approximately 0.98 (e.g., predicted value is at 98% probability), and the AUC value does not indicate a change with addition of features. Accordingly, vehicle mode determination system 201 may not need more than 30-40 features, thereby limiting a number of features based on MEMS data, and/or GPS data. Accordingly, techniques disclosed herein improve the computing system by enabling prediction with fewer features, which requires less computational resources. Utilization of fewer features is another advantage of perform edge-computing.

In some embodiments, vehicle mode determination system 201 may determine, based on the machine learning model, a respective weight for one or more components of the feature vector. For example, in the previous example, the three components may be values that are weighted sums of the values of the 40 components possibly associated with varying weights assigned to the components. In some embodiments, the machine learning model may be trained to determine, for each type of vehicle, features that may be pertinent to determine the mode, and may accordingly assign weights to features. For example, features that may provide faster prediction of the mode may be associated with higher weights, and features that may not provide faster prediction of the mode may be associated with lower weights.

For example, when a car is in motion and goes over bumps in the road, an FFT may depict a large spike at 2 Hz. As another example, an FFT associated with a train may depict a spike at 10 Hz. Accordingly, based on the frequency values vehicle mode determination system 201 may determine a difference between car and a train. In some embodiments, when distinguishing modes between a car and a train, the machine learning model may be trained over such spikes, and may learn to apply higher weights to frequency values that depict such spikes. With further reference to FIG. 4, at step 447, an appropriate feature vector may be generated for further analysis.

In some embodiments, vehicle mode determination system 201 may train, based on a support vector machine (SVM) classifier with a linear kernel, a machine learning model. Upon a determination of a feature vector at step 447, vehicle mode determination system 201 may apply a support vector machine (SVM) classifier. With 2 vehicles, a 2-dimensional graph may be used, and a line may partition the 2 dimensions indicating each vehicle mode.

In some embodiments, vehicle mode determination system 201 may determine, based on the feature vector, an accuracy measure. Generally, AUC values may be utilized as a performance measurement for a classification problem. Also, for example, a receiver operating characteristics (ROC) curve may be utilized. The ROC curve is a probability curve, whereas AUC may represent a degree or measure of separability.

In some embodiments, vehicle mode determination system 201 may determine a threshold for a probability measure associated with a mode. In some embodiments, vehicle mode determination system 201 may determine the mode by comparing the probability measure to the threshold. In some embodiments, vehicle mode determination system 201 may predict, based on the accuracy measure, a mode for the vehicle. In some embodiments, vehicle mode determination system 201 may determine a confusion matrix, and predict the mode based on the confusion matrix. For example, vehicle mode determination system 201 may determine probabilities corresponding to each class or mode. To make predictions, a default method may be to classify the mode with the highest probability. Cutoff thresholds may be changed for different modes to exercise control over how many of each class or mode are predicted, with potential performance tradeoffs. The thresholds may be varied to create tradeoffs for precision, recall, and a number of predictions for each class or mode. For example, the mode may be predicted to be a car if a probability is 0.5. On the other hand, a probability of 0.33 may decrease a number of car predictions. For two class implementations or bimodal cases, the AUC may be used along with precision and recall for metrics. For the multimodal approach, precision and recall may be used as metrics. These, and other examples, are described in several illustrative examples herein.

FIG. 8 illustrates example results of an SVM model for vehicle mode determination based on edge-computing in accordance with one or more aspects described. Comparisons between a car and other vehicles are illustrated. For example, column C1 corresponds to the different vehicles. At R2 shows data for a train as compared to a car. At row R2, column C2, an AUC value of 0.988 is provided, indicating that a distinction between a car and a train may be made with an accuracy of 98.8%. The value of 8000 in row R2, column C3 indicates that the dataset included 8000 car trips (some of the car trips were eliminated from the dataset). The value of 0.8 in row R2, column C4 indicates that 80% of the dataset was utilized to train the SVM model. The value of 9 in row R2, column C5 indicates the threshold for the low pass filter, and the value of 1.75 in row R2, column C6 indicates the threshold for the z-value. A lower z-value indicates a large number of outlier data values.

FIGS. 9A-9C illustrate example graphical representations for a comparison of a car and a train for vehicle mode determination based on edge-computing in accordance with one or more aspects described herein. Referring to FIG. 9A, a driver mode ROC curve is shown corresponding to the AUC value of 0.988 (at row R2, column C2 of FIG. 8).

Referring to FIG. 9B, a table with statistical values based on SVM is shown. The recall value for the train is shown 0.94. This indicates that vehicle mode determination system 201 may be able to predict 94% of the train trips. Such a prediction based on edge-computing is a significant improvement over computations previously performed by a central server that had recall values of 50-60%. The f1-score is an average of the precision value and the recall value, and is shown to be 0.95. This indicates that both the precision value and the recall value are high. Also, for example, and support value is 353, indicating that 353 train trips were used in the dataset. Similar values for the car trips are provided for reference purposes.

Referring now to FIG. 9C, an example confusion matrix is shown. For each car trip and train trip, a known true mode is shown along the vertical axis and the predicted mode is shown along the horizontal axis. For car trips, out of a support value of 714 car trips, the true mode and predicted mode match for 698 car trips, while the true mode and predicted mode do not match for 16 car trips. Out of a support value of 353 train trips, the true mode and predicted mode match for 332 train trips, while the true mode and predicted mode do not match for 21 train trips. Accordingly, vehicle mode determination system 201 may be able to predict the mode with a higher degree of certainty.

Referring again to FIG. 8, row R3 shows data for a bus as compared to a car. At row R3, column C2, an AUC value of 0.965 is provided, indicating that a distinction between a car and a bus may be made with an accuracy of 96.5%. The value of 8000 in row R3, column C3 indicates that the dataset included 8000 car trips (some of the car trips were eliminated from the dataset). The value of 0.8 in row R3, column C4 indicates that 80% of the dataset was utilized to train the SVM model. The value of 9 in row R3, column C5 indicates the threshold for the low pass filter, and the value of 2.0 in row R3, column C6 indicates the threshold for the z-value. A lower z-value indicates a large number of outlier data values.

Figures 10A, 10B, 10C:
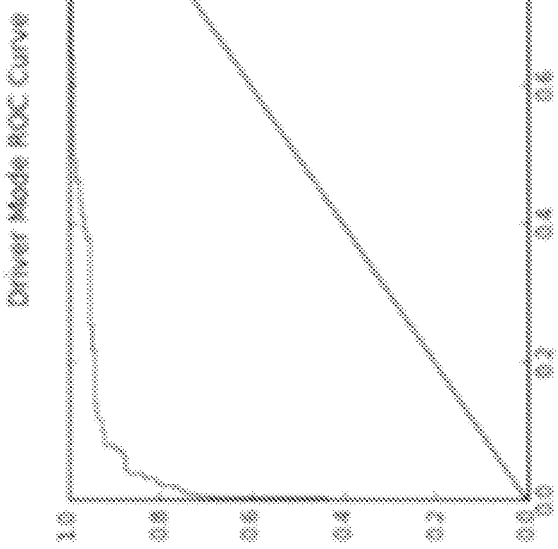
FIGS. 10A-10C illustrate example graphical representations for a comparison of a car and a bus for vehicle mode determination based on edge-computing in accordance with one or more aspects described herein.

FIGS. 10A-10C illustrate example graphical representations for a comparison of a car and a bus for vehicle mode determination based on edge-computing in accordance with one or more aspects described herein. Referring to FIG. 10A, a driver mode ROC curve is shown corresponding to the AUC value of 0.965 (at row R3, column C2 of FIG. 8).

Referring to FIG. 10B, a table with statistical values based on SVM is shown. The recall value for the bus is shown 0.72. This indicates that vehicle mode determination system 201 may be able to predict 72% of the bus trips. Such a prediction based on edge-computing is a significant improvement over computations previously performed by a central server that had recall values of 10%. Generally, GPS based techniques may enable determination of a distance to train tracks, a distance to water, a speed, etc. However, as GPS data is collected once every 15 seconds, whereas MEMS data is collected 50 times a second, that vehicle mode determination system 201 may provide enhanced prediction. The f1-score is an average of the precision value and the recall value, and is shown to be 0.82. This indicates that both the precision value and the recall value are generally high. Also, for example, and support value is 180, indicating that 180 bus trips were used in the dataset. Similar values for the car trips are provided for reference purposes.

Referring now to FIG. 10C, an example confusion matrix is shown. For each car trip and bus trip, a known true mode is shown along the vertical axis and the predicted mode is shown along the horizontal axis. For car trips, out of a support value of 839 car trips, the true mode and predicted mode match for 834 car trips, while the true mode and predicted mode do not match for 5 car trips. Out of a support value of 180 bus trips, the true mode and predicted mode match for 129 bus trips, while the true mode and predicted mode do not match for 51 bus trips. Accordingly, vehicle mode determination system 201 may be able to predict the mode with a higher degree of certainty.

Referring again to FIG. 8, row R4 shows data for a boat as compared to a car. At row R4, column C2, an AUC value of 0.983 is provided, indicating that a distinction between a car and a boat may be made with an accuracy of 98.3%. The value of 2200 in row R4, column C3 indicates that the dataset included 2200 car trips (some of the car trips were eliminated from the dataset). In this example, as less data is available for boats, a larger number of car data were eliminated from the dataset. The value of 0.8 in row R4, column C4 indicates that 80% of the dataset was utilized to train the SVM model. The value of 9 in row R4, column C5 indicates the threshold for the low pass filter, and the value of 3.5 in row R4, column C6 indicates the threshold for the z-value. A lower z-value indicates a large number of outlier data values. In this instance, the z-value is larger than those for the train and the bus. This may be indicative of fewer outliers for the boat than for a train and the bus.

FIGS. 11A-11C illustrate example graphical representations for a comparison of a car and a boat for vehicle mode determination based on edge-computing in accordance with one or more aspects described herein. Referring to FIG. 11A, a driver mode ROC curve is shown corresponding to the AUC value of 0.983 (at row R4, column C2 of FIG. 8).

Referring to FIG. 11B, a table with statistical values based on SVM is shown. The recall value for the boat is shown 0.85. This indicates that vehicle mode determination system 201 may be able to predict 85% of the boat trips. The f1-score is an average of the precision value and the recall value, and is shown to be 0.92. This indicates that both the precision value and the recall value are high. Also, for example, and support value is 39, indicating that a very small number of 39 boat trips were used in the dataset. Similar values for the car trips are provided for reference purposes.

Referring now to FIG. 11C, an example confusion matrix is shown. For each car trip and boat trip, a known true mode is shown along the vertical axis and the predicted mode is shown along the horizontal axis. For car trips, out of a support value of 374 car trips, the true mode and predicted mode match for 374 car trips, while the true mode and predicted mode do not match for 0 car trips. Out of a support value of 39 boat trips, the true mode and predicted mode match for 33 boat trips, while the true mode and predicted mode do not match for 6 boat trips. Accordingly, vehicle mode determination system 201 may be able to predict the mode with a higher degree of certainty.

Referring again to FIG. 8, row R5 shows data for a bicycle as compared to a car. At row R5, column C2, an AUC value of 0.840 is provided, indicating that a distinction between a car and a bicycle may be made with an accuracy of 84%. The value of 6000 in row R5, column C3 indicates that the dataset included 6000 car trips (some of the car trips were eliminated from the dataset). This value of 6000 is higher than the value of 2200 for boats, as there may be more data values corresponding to bicycles than for boats. Accordingly, a fewer number of car data were eliminated from the dataset for cars and bicycles, than from the dataset of cars and boats. However, this value of 6000 for bicycles is lower than the value 8000 for trains and buses, as there may be more data available for trains and buses than for bicycles. Accordingly, a larger number of car data were eliminated from the dataset. The value of 0.8 in row R5, column C4 indicates that 80% of the dataset was utilized to train the SVM model. The value of 9 in row R5, column C5 indicates the threshold for the low pass filter, and the value of 10 in row R5, column C6 indicates the threshold for the z-value. A higher z-value indicates a smaller number of outlier data values. In this instance, a z-value of 10 indicates that there were very few outlier values in the dataset.

FIGS. 12A-12C illustrate example graphical representations for a comparison of a car and a bicycle for vehicle mode determination based on edge-computing in accordance with one or more aspects described herein. Referring to FIG. 12A, a driver mode ROC curve is shown corresponding to the AUC value of 0.840 (at row R5, column C2 of FIG. 8).

Referring to FIG. 12B, a table with statistical values based on SVM is shown. The recall value for the bicycle is shown 0.61. This indicates that vehicle mode determination system 201 may be able to predict 61% of the bicycle trips. The f1-score is an average of the precision value and the recall value, and is shown to be 0.60. This indicates that both the precision value and the recall value are low. Also, for example, and support value is 36, indicating that a small number of 36 bicycle trips were used in the dataset. This is an indication of the low recall value for bicycles. Similar values for the car trips are provided for reference purposes.

Referring now to FIG. 12C, an example confusion matrix is shown. For each car trip and bicycle trip, a known true mode is shown along the vertical axis and the predicted mode is shown along the horizontal axis. For car trips, out of a support value of 579 car trips, the true mode and predicted mode match for 564 car trips, while the true mode and predicted mode do not match for 15 car trips. Out of a support value of 36 bicycle trips, the true mode and predicted mode match for 22 bicycle trips, while the true mode and predicted mode do not match for 14 bicycle trips. Accordingly, vehicle mode determination system 201 may be able to predict the mode with a higher degree of certainty.

Referring again to FIG. 8, row R6 shows data for an airplane as compared to a car. At row R6, column C2, an AUC value of 0.990 is provided, indicating that a distinction between a car and an airplane may be made with an accuracy of 99%. The value of 6000 in row R6, column C3 indicates that the dataset included 6000 car trips (some of the car trips were eliminated from the dataset). This value of 6000 is the same as for bicycles, and for substantially similar reasons. The value of 0.8 in row R6, column C4 indicates that 80% of the dataset was utilized to train the SVM model. The value of 9 in row R6, column C5 indicates the threshold for the low pass filter, and the value of 10 in row R6, column C6 indicates the threshold for the z-value. A higher z-value indicates a smaller number of outlier data values. In this instance, a z-value of 10 indicates that there were very few outlier values in the dataset.

Figures 13A, 13B, 13C:
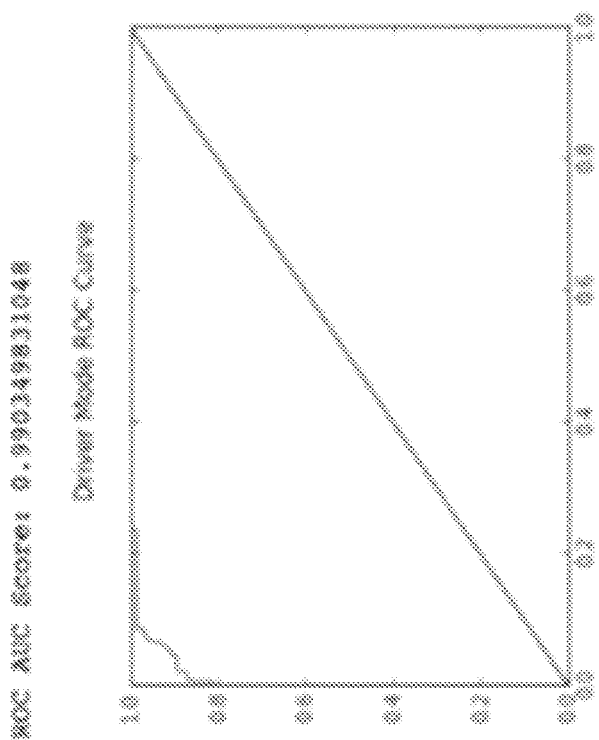
FIGS. 13A-13C illustrate example graphical representations for a comparison of a car and an airplane for vehicle mode determination based on edge-computing in accordance with one or more aspects described herein.

FIGS. 13A-13C illustrate example graphical representations for a comparison of a car and an airplane for vehicle mode determination based on edge-computing in accordance with one or more aspects described herein. Referring to FIG. 13A, a driver mode ROC curve is shown corresponding to the AUC value of 0.990 (at row R6, column C2 of FIG. 8).

Referring to FIG. 13B, a table with statistical values based on SVM is shown. The recall value for the airplane is shown as 0.80. This indicates that vehicle mode determination system 201 may be able to predict 80% of the airplane trips. Generally, airplane mode prediction is based on GPS data, and based at least in part on this, the recall value is lower. This is another indication as to why including MEMS data is an improvement over techniques based on GPS features alone. The f1-score is an average of the precision value and the recall value, and is shown to be 0.88. This indicates that both the precision value and the recall value are generally high. Also, for example, and support value is 86, indicating that 86 airplane trips were used in the dataset. Similar values for the car trips are provided for reference purposes.

Referring now to FIG. 13C, an example confusion matrix is shown. For each car trip and airplane trip, a known true mode is shown along the vertical axis and the predicted mode is shown along the horizontal axis. For car trips, out of a support value of 1170 car trips, the true mode and predicted mode match for 1169 car trips, while the true mode and predicted mode do not match for 1 car trips. Out of a support value of 86 airplane trips, the true mode and predicted mode match for 69 airplane trips, while the true mode and predicted mode do not match for 17 airplane trips. Accordingly, vehicle mode determination system 201 may be able to predict the mode with a higher degree of certainty.

Referring again to FIG. 8, row R7 shows data for a motorcycle as compared to a car. At row R7, column C2, an AUC value of 0.712 is provided, indicating that a distinction between a car and a motorcycle may be made with an accuracy of 71.2%. The value of 2500 in row R7, column C3 indicates that the dataset included 2500 car trips (some of the car trips were eliminated from the dataset). This is similar to the number of car trips in the data set for boats, reflecting a similar number of datasets available for boats and motorcycles. The value of 0.8 in row R7, column C4 indicates that 80% of the dataset was utilized to train the SVM model. The value of 9 in row R7, column C5 indicates the threshold for the low pass filter, and value of 10 in row R7, column C6 indicates the threshold for the z-value. A higher z-value indicates a smaller number of outlier data values. In this instance, a z-value of 10 indicates that there were very few outlier values in the dataset.

FIGS. 14A-14C illustrate example graphical representations for a comparison of a car and a motorcycle for vehicle mode determination based on edge-computing in accordance with one or more aspects described herein. Referring to FIG. 14A, a driver mode ROC curve is shown corresponding to the AUC value of 0.712 (at row R7, column C2 of FIG. 8).

Referring to FIG. 14B, a table with statistical values based on SVM is shown. The recall value for the motorcycle is shown as 0.17. This indicates that vehicle mode determination system 201 may be able to predict 17% of the motorcycle trips, based at least in part on a very small sample dataset that is used for motorcycles. The f1-score is an average of the precision value and the recall value, and is shown to be 0.29. This reflects that the precision value is 1.00 and the recall value is 0.17. Also, for example, the support value is 71, indicating that a small number of 71 motorcycle trips were used in the dataset. Similar values for the car trips are provided for reference purposes.

Referring now to FIG. 14C, an example confusion matrix is shown. For each car trip and motorcycle trip, a known true mode is shown along the vertical axis and the predicted mode is shown along the horizontal axis. For car trips, out of a support value of 461 car trips, the true mode and predicted mode match for 461 car trips, while the true mode and predicted mode do not match for 0 car trips. Therefore, vehicle mode determination system 201 may predict 100% of the car trips. Out of a support value of 71 motorcycle trips, the true mode and predicted mode match for 12 motorcycle trips, while the true mode and predicted mode do not match for 59 motorcycle trips. Although these prediction rates for motorcycles are lower, this is reflective of the very small sample dataset that is used for motorcycles, and is also indicative of a robustness of the determination performed herein. As illustrated by this case, a larger dataset may be advantageous to predicting the mode.

Figures 15A, 15B:
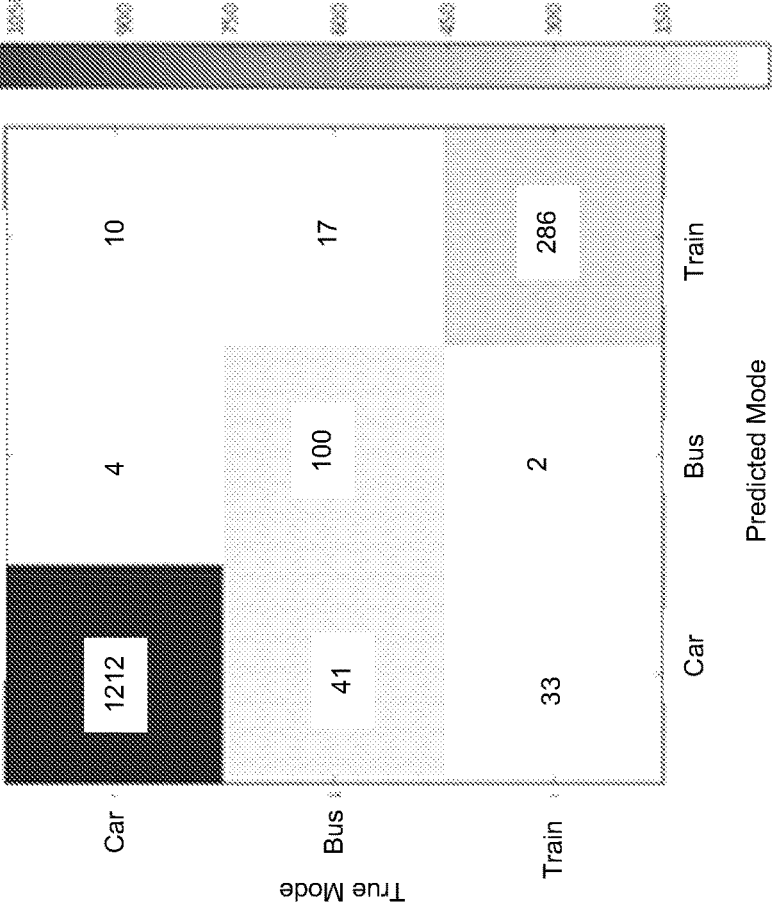
FIGS. 15A-15B illustrate example graphical representations for a multimodal case for vehicle mode determination based on edge-computing in accordance with one or more aspects described herein.

In some embodiments, vehicle mode determination system 201 may perform a multimodal prediction. FIGS. 15A-15B illustrate example graphical representations for a multimodal case for vehicle mode determination based on edge-computing in accordance with one or more aspects described herein in accordance with one or more aspects described herein. Referring to FIG. 15A, a table with statistical values based on SVM is shown for a car, a train, and a bus. The recall value for a car is shown as 0.99, recall value for a bus is shown as 0.63, and recall value for a train is shown as 0.89. This indicates that, in a multimodal instance such as this example, vehicle mode determination system 201 may be able to predict 99% of the car trips, 63% of the bus trips, and 89% of the train trips. The f1-score is an average of the precision value and the recall value, and is shown to be 0.96 for car trips, 0.76 for bus trips, and 0.90 for train trips. Also, for example, the support values are 1226 for car trips, 158 for bus trips, and 221 for train trips, indicating that a small number of bus trips were used in the dataset, and a slightly higher number of train trips were used.

Referring now to FIG. 15B, an example confusion matrix is shown. For each car, bus, and train trip, a known true mode is shown along the vertical axis and the predicted mode is shown along the horizontal axis. For car trips, out of a support value of 1226 car trips, the true mode and predicted mode match for 1212 car trips, while 4 car trips are erroneously predicted to be bus trips, and 10 car trips are erroneously predicted to be train trips. Out of a support value of 158 bus trips, the true mode and predicted mode match for 100 bus trips, while 41 bus trips are erroneously predicted to be car trips, and 17 bus trips are erroneously predicted to be train trips. Out of a support value of 321 train trips, the true mode and predicted mode match for 286 train trips, while 33 train trips are erroneously predicted to be car trips, and 2 train trips are erroneously predicted to be bus trips. Accordingly, based on available data, vehicle mode determination system 201 may be able to predict the mode with a high degree of certainty for cars and trains, and a lower degree of certainty for bus trips (based in part on the smaller sample size).

Figures 16A, 16B, 16C:
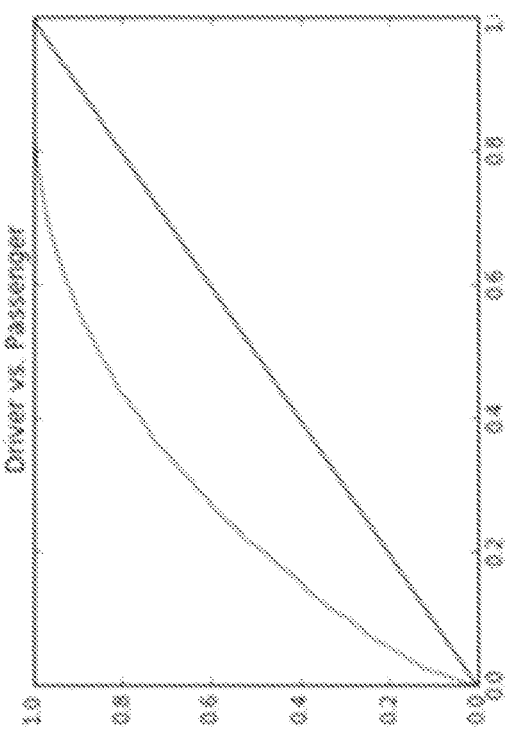
FIG. 16A-16C illustrate example graphical representations to distinguish between a driver and a passenger of a vehicle in vehicle mode determination based on edge-computing in accordance with one or more aspects described herein.

In some embodiments, vehicle mode determination system 201 may, after prediction of the vehicle mode, determine whether the on-board mobile computing device is associated with a driver or a passenger of the vehicle. FIG. 16A-16C illustrate example graphical representations to distinguish between a driver and a passenger of a vehicle in vehicle mode determination based on edge-computing in accordance with one or more aspects described herein in accordance with one or more aspects described herein. Referring to FIG. 16A, a driver mode ROC curve is shown for corresponding to an AUC value of 0.743.

Referring to FIG. 16B, a table with statistical values based on SVM is shown. The recall value for the passenger is shown as 0.25, and a recall value for the driver is shown as 0.98. This indicates that vehicle mode determination system 201 may be able to predict 25% of the passengers and 98% of the drivers. The f1-score for the passenger values is shown to be 0.38, indicating a low recall value. However, the f1-score for the driver data is 0.90 indicating that both the precision value and the recall value are high. Also, for example, the support value for passengers is 3684, and the support value for driver data is 14279.

Referring now to FIG. 16C, an example confusion matrix is shown. For each driver and passenger, a known true mode is shown along the vertical axis and the predicted mode is shown along the horizontal axis. For passengers, out of a support value of 3684 car trips, the true mode and predicted mode match for 913 passengers, while the true mode and predicted mode do not match for 2771 passengers. Out of a support value of 14279 drivers, the true mode and predicted mode match for 14030 drivers, while the true mode and predicted mode do not match for 249 drivers.

Figure 17:
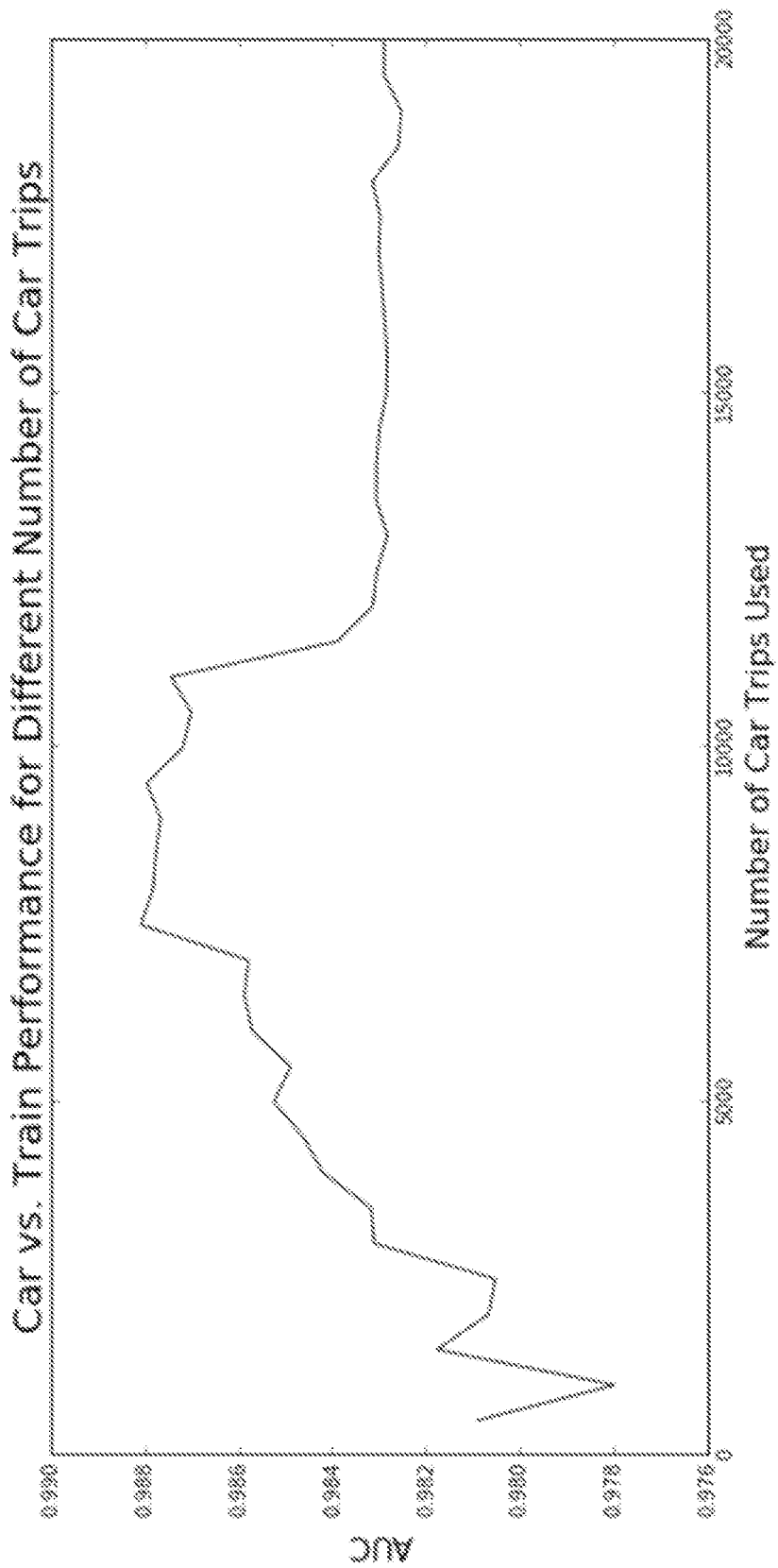
FIG. 17 illustrates an example graphical representation to select a number of trips in vehicle mode determination based on edge-computing in accordance with one or more aspects described herein.

In some embodiments, vehicle mode determination system 201 may determine, for each vehicle mode, an optimal number of trips to be used for the predicting the vehicle mode. FIG. 17 illustrates an example graphical representation to select a number of trips in vehicle mode determination based on edge-computing in accordance with one or more aspects described herein in accordance with one or more aspects described herein. The horizontal axis indicates a number of car trips used, and the vertical axis indicates a determined AUC value. As indicated, between 7000-10000 trips, the AUC value is in a range of approximately 0.988 (e.g., predicted value is at 98.8% probability), and the AUC value drops with an addition of car trips. Accordingly, vehicle mode determination system 201 may determine 7000-10000 trips as an optimal number of car trips needed for prediction of the mode. Accordingly, techniques disclosed herein improve the computing system by enabling prediction with an optimal number of datasets, which results in an efficient utilization of computational resources.

Figure 18:
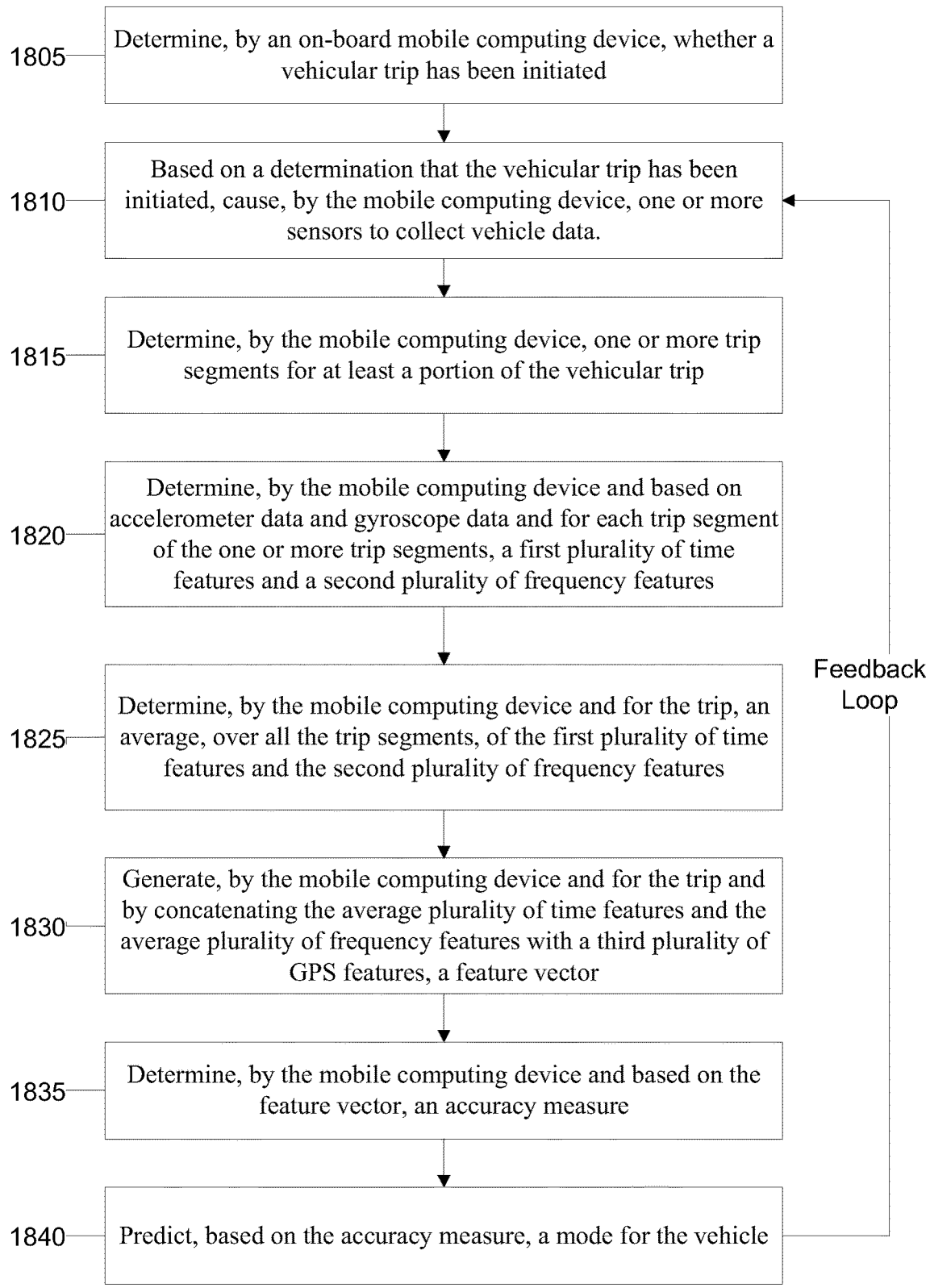
FIG. 18 illustrates an example method for vehicle mode determination based on edge-computing in accordance with one or more aspects described herein.

The steps that follow in FIG. 18 may be implemented by one or more of the components in FIGS. 1 through 3 and/or other components, including other computing devices. FIG. 18 illustrates an example method for vehicle mode determination based on edge-computing in accordance with one or more aspects described herein.

At step 1805, vehicle mode determination system 201 may determine, by an on-board mobile computing device, whether a vehicular trip has been initiated.

At step 1810, vehicle mode determination system 201 may, based on a determination that the vehicular trip has been initiated, cause one or more sensors to collect vehicle data, where the vehicle data includes at least one of: accelerometer data, gyroscope data, and GPS data. For instance, the vehicle mode determination system 201 may activate or otherwise enable one or more sensors to begin data collection functions.

At step 1815, vehicle mode determination system 201 may determine one or more trip segments for at least a portion of the vehicular trip.

At step 1820, vehicle mode determination system 201 may determine, by the mobile computing device and based on the accelerometer data and the gyroscope data and for each trip segment of the one or more trip segments, a first plurality of time features and a second plurality of frequency features.

At step 1825, vehicle mode determination system 201 may determine, by the mobile computing device and for the trip, an average, over all the trip segments, of the first plurality of time features and the second plurality of frequency features. For example, for a trip comprising two trip segments, each trip segment may be associated with a plurality of time features, such as, for example, $T_1 = <t_{11}, t_{12}, \ldots, t_{1n}>$, and $T_2 = <t_{21}, t_{22}, \ldots, t_{2n}>$. Then, vehicle mode determination system 201 may determine an average of the time features over the trip segments, to obtain an averaged plurality of time features:

$$T = \left\langle \frac{t_{11} + t_{11}}{2}, \frac{t_{12} + t_{22}}{2}, \ldots, \frac{t_{1n} + t_{2n}}{2} \right\rangle \quad \text{(Eqn. 1)}$$

In some embodiments, the average may comprise a weighted average, where trip segments may be assigned weights. Also, for example, vehicle mode determination system 201 may determine an average of the frequency features over the trip segments, to obtain an averaged plurality of frequency features.

At step 1830, vehicle mode determination system 201 may generate, for the trip and by concatenating the average plurality of time features and the average plurality of frequency features with a third plurality of GPS features, a feature vector.

At step 1835, vehicle mode determination system 201 may determine, based on the feature vector, an accuracy measure.

At step 1840, vehicle mode determination system 201 may predict, based on the accuracy measure, a mode for the vehicle.

Figure 19:
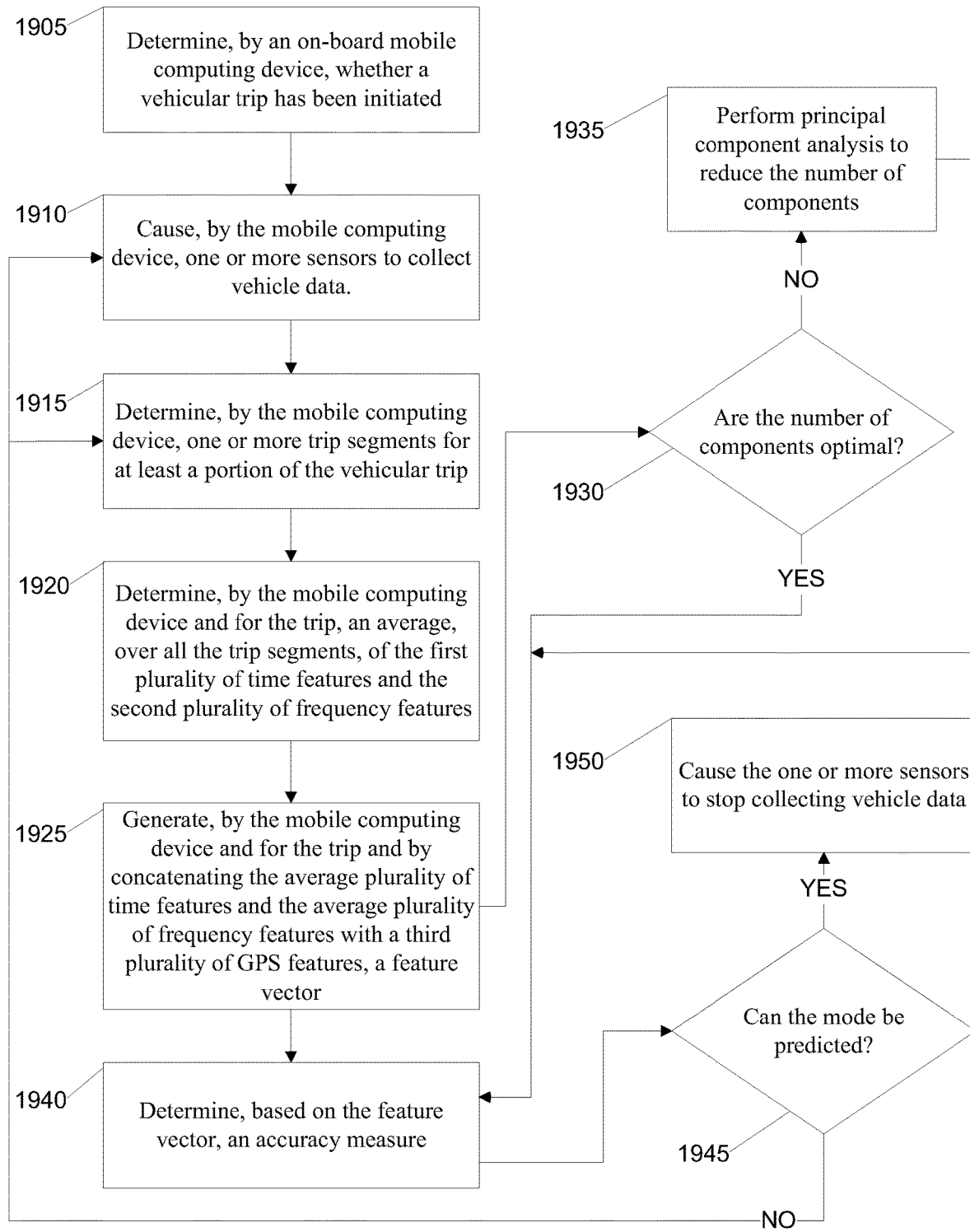
FIG. 19 illustrates another example method for vehicle mode determination based on edge-computing in accordance with one or more aspects described herein.

The steps that follow in FIG. 19 may be implemented by one or more of the components in FIGS. 1 through 3 and/or other components, including other computing devices. FIG. 19 illustrates an example method for vehicle mode determination based on edge-computing in accordance with one or more aspects described herein.

At step 1905, vehicle mode determination system 201 may determine, by an on-board mobile computing device, whether a vehicular trip has been initiated.

At step 1910, vehicle mode determination system 201 may, based on a determination that the vehicular trip has been initiated, cause one or more sensors to collect vehicle data, where the vehicle data includes at least one of: accelerometer data, gyroscope data, and GPS data.

At step 1915, vehicle mode determination system 201 may determine one or more trip segments for at least a portion of the vehicular trip.

At step 1920, vehicle mode determination system 201 may generate, by concatenating a first plurality of time features and a second plurality of frequency features with a third plurality of GPS features, a feature vector.

At step 1925, vehicle mode determination system 201 may make a determination whether the number of components in the feature vector is optimal. Upon a determination that the number of components in the feature vector is not optimal, the process may proceed to step 1930. At step 1930, vehicle mode determination system 201 may perform a principal component analysis of the feature vector to reduce the number of components. In some embodiments, the process may proceed to step 1935.

Upon a determination that the number of components in the feature vector is optimal, the process may proceed to step 1935. At step 1935, vehicle mode determination system 201 may determine, based on the feature vector, an accuracy measure.

At step 1940, vehicle mode determination system 201 may make a determination whether the vehicle mode may be predicted. Upon a determination that the vehicle mode may not be predicted, the process may proceed to step 1910, to collect additional vehicle data, and/or proceed to step 1915 to add additional trip segments.

Upon a determination that the vehicle mode may be predicted, the process may proceed to step 1945. At step 1945, vehicle mode determination system 201 may cause the one or more sensors to stop collecting vehicle data.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
   collecting vehicle data associated with a vehicle from one or more sensors based on a determination that a vehicular trip has been initiated;
   determining one or more trip segments for at least a portion of the vehicular trip;
   determining, using the vehicle data, one or more time domain features and one or more frequency domain features for each trip segment of the one or more trip segments;
   generating a first feature vector using the one or more time domain features and the one or more frequency domain features;
   after determining that a quantity of features in the first feature vector exceeds a reduced quantity of features that is sufficient for predicting a vehicle mode, generating a second feature vector that comprises the reduced quantity of features, wherein the features in the second feature vector are determined by applying principal component analysis to the features of the first feature vector;
   determining an accuracy measure based on the second feature vector;
   predicting a mode for the vehicle based on the accuracy measure, the mode for the vehicle includes a type of vehicle; and
   ceasing the collection of vehicle data associated with the vehicle from the one or more sensors, and while the vehicle is still traveling, upon a determination that the mode can be predicted.

2. The method of claim 1, wherein the one or more sensors are associated with one or more of the vehicle, a telematic device, or a mobile computing device.

3. The method of claim 1, wherein the one or more sensors include one or more of an accelerometer, a gyroscope, or a locational sensor.

4. The method of claim 1, wherein the vehicle data includes one or more of location data, speed data, direction data, acceleration data, and braking data.

5. The method of claim 1, wherein the first feature vector is generated based on one or more GPS features.

6. The method of claim 1, wherein the vehicle is one of an automobile, a motorcycle, scooters, a bus, a recreational vehicle, or a boat.

7. A vehicle mode determination device, comprising:
a processor; and
a memory unit storing computer-executable instructions, which when executed by the processor, cause the processor to:
determine one or more segments for at least a portion of a vehicular trip;
determine, using vehicle data collected via one or more sensors associated with a vehicle, one or more time domain features and one or more frequency domain features for each trip segment of the one or more segments, the vehicle data collected by one or more sensors when the vehicular trip is initiated;
generate a first feature vector by concatenating the one or more time domain features with the one or more frequency domain features;
after determining that a quantity of features in the first feature vector exceeds a reduced quantity of features that is sufficient for predicting a vehicle mode, generating a second feature vector that comprises the reduced quantity of features, wherein the features in the second feature vector are determined by applying principal component analysis to the features of the first feature vector;
determine an accuracy measure based on the second feature vector; and
predict a vehicle mode based on the accuracy measure.

8. The vehicle mode determination device of claim 7, wherein the computer-executable instructions, when executed by the processor, further cause the processor to:
cease the collection of vehicle data associated with the vehicle from the one or more sensors upon a determination that the vehicle mode can be predicted.

9. The vehicle mode determination device of claim 7, wherein the one or more sensors are associated with one or more of a vehicle, a telematic device, or the vehicle mode determination device.

10. The vehicle mode determination device of claim 7, wherein the one or more sensors include one or more of an accelerometer, a gyroscope, or a locational sensor.

11. The vehicle mode determination device of claim 7, wherein the vehicle data includes one or more of location data, speed data, direction data, acceleration data, and braking data.

12. The vehicle mode determination device of claim 7, wherein the first feature vector is generated based on one or more GPS features.

13. The vehicle mode determination device of claim 7, wherein the vehicle mode includes a type of vehicle.

14. One or more non-transitory computer-readable media storing instructions that, when executed by a computing device, cause the computing device to:
collect vehicle data associated with a vehicle from one or more sensors when a vehicular trip has been initiated;
determine one or more trip segments for at least a portion of the vehicular trip;
determine, using the vehicle data, one or more time domain features and one or more frequency domain features for each trip segment of the one or more trip segments;
generate a first feature vector using the one or more time domain features and the one or more frequency domain features;
after determining that a quantity of features in the first feature vector exceeds a reduced quantity of features that is sufficient for predicting a vehicle mode, generate a second feature vector that comprises the reduced quantity of features, wherein the features in the second feature vector are determined by applying principal component analysis to the features of the first feature vector;
determine, based on a machine learning model, a respective weight for one or more components of the second feature vector;
determine an accuracy measure based on the second feature vector; and
predict a mode for the vehicle based on the accuracy measure.

15. The one or more non-transitory computer-readable media storing instructions of claim 14 that, when executed by the computing device, cause the computing device to:
cease the collection of vehicle data associated with the vehicle from the one or more sensors upon a determination that the mode can be predicted.

16. The one or more non-transitory computer-readable media storing instructions of claim 14, wherein the one or more sensors are associated with one or more of the vehicle, a telematic device, or the computing device.

17. The one or more non-transitory computer-readable media storing instructions of claim 14, wherein the one or more sensors include one or more of an accelerometer, a gyroscope, or a locational sensor.

18. The one or more non-transitory computer-readable media storing instructions of claim 14, wherein the vehicle data includes one or more of location data, speed data, direction data, acceleration data, and braking data.

19. The one or more non-transitory computer-readable media storing instructions of claim 14, wherein the first feature vector is generated based on one or more GPS features.

* * * * *